(12) United States Patent
Bao et al.

(10) Patent No.: US 10,805,532 B2
(45) Date of Patent: Oct. 13, 2020

(54) SYSTEM AND METHOD FOR OBTAINING SPHERICAL PANORAMA IMAGE

(71) Applicant: SZ DJI TECHNOLOGY CO., LTD., Shenzhen (CN)

(72) Inventors: Linchao Bao, Shenzhen (CN); Pan Hu, Shenzhen (CN); Zisheng Cao, Shenzhen (CN); Mingyu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/171,726

(22) Filed: Oct. 26, 2018

(65) Prior Publication Data

US 2019/0068879 A1   Feb. 28, 2019

Related U.S. Application Data

(63) Continuation of application No. PCT/CN2016/080559, filed on Apr. 28, 2016.

(51) Int. Cl.
| | |
|---|---|
| *H04N 5/232* | (2006.01) |
| *G03B 21/14* | (2006.01) |
| *G06T 3/40* | (2006.01) |
| *G06T 7/80* | (2017.01) |
| *G03B 37/02* | (2006.01) |
| *H04N 5/262* | (2006.01) |
| *H04N 7/18* | (2006.01) |
| *G03B 15/00* | (2006.01) |

(52) U.S. Cl.
CPC ....... *H04N 5/23238* (2013.01); *G03B 21/142* (2013.01); *G03B 37/02* (2013.01); *G06T 3/4038* (2013.01); *G06T 7/80* (2017.01); *H04N 5/2628* (2013.01); *G03B 15/006* (2013.01); *H04N 7/18* (2013.01)

(58) Field of Classification Search
CPC .... H04N 5/23238; H04N 5/2628; H04N 7/18; H04N 13/156; G06T 1/0007; G06T 2207/20221; G06T 7/80; G03B 21/142
See application file for complete search history.

(56) References Cited

U.S. PATENT DOCUMENTS 9,313,429 B1    4/2016  Myers et al.
2010/0245571 A1  9/2010  Devoe
(Continued)

FOREIGN PATENT DOCUMENTS

CN    101782713 A    7/2010
CN    101916452 A   12/2010
(Continued)

OTHER PUBLICATIONS

Santosh D.R. et al., Image Mosaicing using Cylindrical Mapping, International Journal of Robotics and Mechatronics, Oct. 30, 2014, pp. 67-69.
(Continued)

*Primary Examiner* — Obafemi O Sosanya
(74) *Attorney, Agent, or Firm* — Anova Law Group, PLLC

(57) ABSTRACT

An image processing method includes receiving an image of a scene and attitude information that is used by an imaging device to capture the image of the scene, and stitching the received image of the scene to a panorama image of the scene built on a compositing surface based on the attitude information.

19 Claims, 16 Drawing Sheets

(56) References Cited

U.S. PATENT DOCUMENTS

| | | |
|---|---|---|
| 2011/0115916 A1 | 5/2011 | Yafuso |
| 2013/0250047 A1 | 9/2013 | Hollinger |
| 2016/0012855 A1* | 1/2016 | Krishnan ............. G11B 27/105 |
| | | 386/241 |
| 2016/0037082 A1* | 2/2016 | Wang ...................... G06T 5/006 |
| | | 348/65 |
| 2016/0088287 A1* | 3/2016 | Sadi ....................... G03B 35/08 |
| | | 348/43 |

FOREIGN PATENT DOCUMENTS

| | | |
|---|---|---|
| CN | 102279515 A | 12/2011 |
| CN | 102984453 A | 3/2013 |
| CN | 103135332 A | 6/2013 |
| CN | 104777701 A | 7/2015 |
| CN | 104859857 A | 8/2015 |
| WO | 2014008320 A1 | 1/2014 |

OTHER PUBLICATIONS

The World Intellectual Property Organization (WIPO) International Search Report and Written Opinion for PCT/CN2016/080559 dated Jan. 26, 2017 11 Pages.

\* cited by examiner

SYSTEM AND METHOD FOR OBTAINING SPHERICAL PANORAMA IMAGE

CROSS-REFERENCE TO RELATED APPLICATION

This application is a continuation of International Application No. PCT/CN2016/080559, filed on Apr. 28, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to imaging and more particularly, but not exclusively, to a design for automatically obtaining a spherical panorama image based on imaging parameters.

BACKGROUND

Spherical panorama, also known as three-hundred-sixty degree spherical panorama, refers to a panorama image covers three-hundred-sixty degrees in a horizontal plane as well as at least one-hundred-eighty degree in a vertical plane.

Spherical panorama images have gained popularity in recent years. However, currently-available spherical panorama imaging approaches require manual control of an imaging device and/or a device, such as a gimbal and an unmanned aerial vehicle ("UAV"), to be coupled with the imaging device.

In view of the foregoing reasons, there is a need for a system and method for automatically capturing images forming a panorama image and stitching the captured images together.

SUMMARY

In accordance with a first aspect disclosed herein, there is set forth a method for supporting imaging, comprising:
 collecting at least one imaging parameter; and
 devising an imaging scheme for obtaining a panorama image based on the imaging parameter.

In an exemplary embodiment of the disclosed methods, collecting the imaging parameter comprises retrieving at least one imaging parameter of an imaging device.

In another exemplary embodiment of the disclosed methods, devising the imaging scheme comprises constructing the imaging scheme based on a field-of-view ("FOV") of the imaging device.

In another exemplary embodiment of the disclosed methods, devising the imaging scheme comprises constructing the imaging scheme based on a horizontal angle of the FOV and/or a vertical angle of the FOV.

In another exemplary embodiment of the disclosed methods, collecting the at least one imaging parameter comprises retrieving at least one parameter of a gimbal for coupling with the imaging device.

In another exemplary embodiment of the disclosed methods, devising the imaging scheme comprises constructing the imaging scheme based on a maximum yaw angle of the gimbal.

In another exemplary embodiment of the disclosed methods, devising the imaging scheme comprises constructing the imaging scheme based on a maximum pitch angle of the gimbal.

In another exemplary embodiment of the disclosed methods, collecting the at least one imaging parameter comprises retrieving at least one parameter of a mobile platform associated with the imaging device and/or the gimbal.

In another exemplary embodiment of the disclosed methods, devising the imaging scheme comprises constructing the imaging scheme based on a maximum pitch angle of the mobile platform.

In another exemplary embodiment of the disclosed methods, devising the imaging scheme comprises determining a number of images for forming a spherical panorama image.

In another exemplary embodiment of the disclosed methods, determining the number of images comprises determining a number of image rows, each image row being associated with a preselected pitch angle.

In another exemplary embodiment of the disclosed methods, determining the number of images comprises determining a number of images in each of the image rows, each image being at a predetermined yaw angle.

In another exemplary embodiment of the disclosed methods, determining the number of images comprises deciding an overlapping area between adjacent images.

In another exemplary embodiment of the disclosed methods, deciding the overlapping area comprises determining a number of rows of images for securing a vertical overlapping area between two images that are adjacent in a longitude direction.

In another exemplary embodiment of the disclosed methods, determining the number of rows comprises securing the vertical overlapping area with an overlapping height not less than a predetermined ratio to a height of any of the two adjacent images.

In another exemplary embodiment of the disclosed methods, deciding the overlapping area comprises deciding a pitch angle for each of the image rows based on maximum pitch angles in an upward direction and/or a downward direction relative to a horizontal direction.

In another exemplary embodiment of the disclosed methods, deciding the pitch angle comprises selecting an image row at a pitch angle in the horizontal direction.

In another exemplary embodiment of the disclosed methods, deciding the pitch angle comprises deciding rows in the upward direction where the pitch angle is above the horizontal direction.

In another exemplary embodiment of the disclosed methods, deciding the pitch angle comprises deciding rows in the downward direction where the pitch angle is below the horizontal direction.

In another exemplary embodiment of the disclosed methods, deciding the overlapping area comprises deciding the number of images in each image row for securing a horizontal overlapping area between two images that are adjacent in a latitude direction.

In another exemplary embodiment of the disclosed methods, deciding the number of images comprises securing the horizontal overlapping area with a width not less than a predetermined ratio to a width of any of the adjacent images.

Exemplary embodiments of the disclosed methods further comprise deciding a yaw angle for each of the images in an image row based on a complete horizontal rotation and the number of images in each image row.

In another exemplary embodiment of the disclosed methods, the mobile platform is an unmanned aerial vehicle ("UAV") or a handheld device.

Exemplary embodiments of the disclosed methods further comprise selecting an anchor image for the spherical panorama image.

In another exemplary embodiment of the disclosed methods, selecting the anchor image comprises choosing the anchor image to be as either a top image or a bottom image of the spherical panorama image.

In accordance with another aspect disclosed herein, there is set forth a computer program product comprising instructions for constructing an imaging scheme, being configured to perform the constructing process in accordance with any one of previous embodiments of the disclosed methods.

In accordance with another aspect disclosed herein, there is set forth an apparatus for supporting imaging, comprising:
one or more processors that are individually or collectively configured to collect at least one imaging parameter; and
devise an imaging scheme for obtaining a panorama image based on the imaging parameter.

In an exemplary embodiment of the disclosed apparatuses, the one or more processors are configured to retrieve at least one imaging parameter of an imaging device.

In another exemplary embodiment of the disclosed apparatuses, the one or more processors are configured to construct the imaging scheme based on a field-of-view ("FOV") of the imaging device.

In another exemplary embodiment of the disclosed apparatuses, the one or more processors are configured to construct the imaging scheme based on a horizontal angle of the FOV and/or a vertical angle of the FOV.

In another exemplary embodiment of the disclosed apparatuses, the one or more processors are configured to retrieve at least one parameter of a gimbal for coupling with the imaging device.

In another exemplary embodiment of the disclosed apparatuses, the one or more processors are configured to construct the imaging scheme based on a maximum yaw angle of the gimbal.

In another exemplary embodiment of the disclosed apparatuses, the one or more processors are configured to construct the imaging scheme based on a maximum pitch angle of the gimbal.

In another exemplary embodiment of the disclosed apparatuses, the one or more processors are configured to retrieve at least one parameter of a mobile platform associated with the imaging device and/or the gimbal.

In another exemplary embodiment of the disclosed apparatuses, the one or more processors are configured to construct the imaging scheme based on a maximum pitch angle of the mobile platform.

In another exemplary embodiment of the disclosed apparatuses, the one or more processors are configured to determine a number of images for forming a spherical panorama image.

In another exemplary embodiment of the disclosed apparatuses, the one or more processors are configured to determine a number of image rows, each image row being associated with a preselected pitch angle.

In another exemplary embodiment of the disclosed apparatuses, the one or more processors are configured to determine a number of images in each of the image rows, each image being at a predetermined yaw angle.

In another exemplary embodiment of the disclosed apparatuses, the one or more processors are configured to decide an overlapping area between adjacent images.

In another exemplary embodiment of the disclosed apparatuses, the one or more processors are configured to determine a number of rows of images for securing a vertical overlapping area between two images that are adjacent in a longitude direction.

In another exemplary embodiment of the disclosed apparatuses, the one or more processors are configured to secure the vertical overlapping area with an overlapping height not less than a predetermined ratio to a height of any of the two adjacent images.

In another exemplary embodiment of the disclosed apparatuses, the one or more processors are configured to decide a pitch angle for each of the image rows based on maximum pitch angles in an upward direction and/or a downward direction relative to a horizontal direction.

In another exemplary embodiment of the disclosed apparatuses, the one or more processors are configured to select a first image row at a pitch angle in the horizontal direction.

In another exemplary embodiment of the disclosed apparatuses, the one or more processors are configured to decide rows in the upward direction where the pitch angle is above the horizontal direction.

In another exemplary embodiment of the disclosed apparatuses, the one or more processors are configured to decide rows in the downward direction where the pitch angle is below the horizontal direction.

In another exemplary embodiment of the disclosed apparatuses, the one or more processors are configured to decide the number of images in each image row for securing a horizontal overlapping area between two images that are adjacent in a latitude direction.

In another exemplary embodiment of the disclosed apparatuses, the one or more processors are configured to secure the horizontal overlapping area with a width not less than a predetermined ratio to a width of any of the adjacent images.

In another exemplary embodiment of the disclosed apparatuses, the one or more processors are configured to decide a yaw angle for each of the images in an image row based on a complete horizontal rotation and the number of images in each image row.

In another exemplary embodiment of the disclosed apparatuses, the mobile platform is either an unmanned aerial vehicle ("UAV") or a handheld device.

In another exemplary embodiment of the disclosed apparatuses, the one or more processors are configured to select an anchor image for the spherical panorama image.

In another exemplary embodiment of the disclosed apparatuses, the one or more processors are configured to choose the anchor image to be as either a top image or a bottom image of the spherical panorama image.

In accordance with another aspect disclosed herein, there is set forth an imaging method, comprising:
acquiring an imaging scheme for capturing images of a panorama image; and
automatically capturing a plurality of images according to the imaging scheme.

In an exemplary embodiment of the disclosed methods, capturing the plurality of images comprises navigating a mobile platform to a desired imaging location and/or altitude.

In another exemplary embodiment of the disclosed methods, capturing the plurality of images comprises remotely configuring configurable parameters of an imaging device associated with the mobile platform, the configurable parameters including an exposure setting and/or an output format of the imaging device.

Exemplary embodiments of the disclosed methods further comprise transmitting a spherical panorama imaging command to the imaging device and/or to the mobile platform.

In another exemplary embodiment of the disclosed methods, capturing the plurality of images comprises orienting the imaging device to a desired attitude according to the imaging scheme.

In another exemplary embodiment of the disclosed methods, orienting the imaging device comprises orienting the mobile platform and/or orienting a gimbal to the desired attitude, wherein the gimbal is associated with the imaging device and/or the mobile platform.

In another exemplary embodiment of the disclosed methods, orienting the mobile platform comprises directing the mobile platform to desired yaw-pitch angles according to the imaging scheme.

In another exemplary embodiment of the disclosed methods, orienting the gimbal comprises orienting the gimbal to desired yaw-pitch angles according to the imaging scheme.

In another exemplary embodiment of the disclosed methods, capturing the plurality of images comprises acquiring real-time attitude information for each image.

In another exemplary embodiment of the disclosed methods, acquiring the real-time attitude information comprises acquiring the real-time attitude information as each image is captured.

In another exemplary embodiment of the disclosed methods, acquiring the real-time attitude information comprises acquiring the real-time attitude information via an inertial measurement unit.

In another exemplary embodiment of the disclosed methods, acquiring the real-time attitude information comprises acquiring the real-time attitude information via a gyroscope, an accelerometer, a global positioning system ("GPS") and/or a magnetometer.

In another exemplary embodiment of the disclosed methods, capturing the plurality of images comprises storing the images and the real-time attitude information to a storage device.

In another exemplary embodiment of the disclosed methods, storing the images and the real-time attitude information comprises storing the images and the real-time attitude information to a secure digital ("SD") card.

In another exemplary embodiment of the disclosed methods, capturing the plurality of images comprises sending the images and the attitude information to a ground station.

In another exemplary embodiment of the disclosed methods, sending the images and the attitude information to the ground station comprises sending the images and the attitude information to the ground station as the images are captured or stored.

In another exemplary embodiment of the disclosed methods, capturing the plurality of images comprises orienting the imaging device to another desired attitude position according to the imaging scheme and capturing a next image at the other desired attitude position until each images defined in the imaging scheme are captured.

In another exemplary embodiment of the disclosed methods, capturing the plurality of images comprises:

pointing the imaging device at a preselected pitch angle that is perpendicular to the horizontal direction; and capturing the anchor image according to the imaging scheme.

In another exemplary embodiment of the disclosed methods, capturing the plurality of images comprises:

pointing the imaging device at a preselected pitch angle in the horizontal direction; and capturing an image according to the imaging scheme at a preselected yaw angle.

In another exemplary embodiment of the disclosed methods, capturing the plurality of images comprises:

successively pointing the imaging device to each of the rest yaw angles of the first pitch angle; and capturing respective images at each of the rest yaw angles according to the imaging scheme to acquire the number of images at the first pitch angle.

In another exemplary embodiment of the disclosed methods, capturing the plurality of images comprises:

pointing the imaging device to a successively selected upward pitch angle; and capturing an image according to the imaging scheme at a preselected yaw angle.

In another exemplary embodiment of the disclosed methods, capturing the plurality of images comprises:

pointing the imaging device to rest yaw angles at the selected upward pitch angle; and capturing respective images at each of the rest yaw angles according to the imaging scheme to acquire the number of images at the selected upward pitch angle.

In another exemplary embodiment of the disclosed methods, the number of images for the selected upward pitch angle comprises additional images to the number of images for the first pitch angle.

In another exemplary embodiment of the disclosed methods, capturing the plurality of images comprises:

pointing the imaging device at a successively selected downward pitch angle; and capturing an image according to the imaging scheme at a preselected yaw angle.

In another exemplary embodiment of the disclosed methods, capturing the plurality of images comprises:

orienting the imaging device to rest yaw angles at the selected downward pitch angle; and capturing respective images at each of the rest yaw angles according to the imaging scheme to acquire the number of images at the selected downward pitch angle.

In another exemplary embodiment of the disclosed methods, the number of images for the selected downward pitch angle comprises additional images to the number of images for the first pitch angle.

In another exemplary embodiment of the disclosed methods, sending the images comprises lowering resolution of each of the images.

In another exemplary embodiment of the disclosed methods, lowering the resolution comprises reducing resolution in a horizontal direction and/or reducing resolution in a vertical direction of the image.

In accordance with another aspect disclosed herein, there is set forth a computer program product comprising instructions for capturing images according to an imaging scheme, being configured to perform the imaging process in accordance with any one of previous embodiments of the disclosed methods.

In accordance with another aspect disclosed herein, there is set forth an imaging system, comprising:

one or more processors that are individually or collectively configured to:

acquire an imaging scheme for capturing images of a panorama image; and direct an imaging device to capture a plurality of images according to the imaging scheme.

Exemplary embodiments of the disclosed systems further comprise a mobile platform that is associated with the imaging device.

In an exemplary embodiment of the disclosed systems, the one or more processors are configured to navigate the mobile platform to a desired imaging location and/or altitude.

Exemplary embodiments of the disclosed systems further comprise a controller operates to remotely configure configurable parameters of the imaging device, the configurable parameters including an exposure setting and/or an output format or the imaging device.

In another exemplary embodiment of the disclosed systems, the controller is configured to transmit a spherical panorama imaging command to the imaging device and/or to the mobile platform.

In another exemplary embodiment of the disclosed systems, the one or more processors are configured to orient the imaging device to a desired attitude according to the imaging scheme.

Exemplary embodiments of the disclosed systems further comprise a gimbal being associated with the imaging device and/or the mobile platform, wherein the gimbal operates to orient the imaging device.

In another exemplary embodiment of the disclosed systems, the one or more processors are configured to orient the mobile platform and/or orienting the gimbal to the desired attitude.

In another exemplary embodiment of the disclosed systems, the desired attitude comprises desired yaw-pitch angles of the mobile platform according to the imaging scheme.

In another exemplary embodiment of the disclosed systems, the desired attitude comprises desired yaw-pitch angles of the gimbal according to the imaging scheme.

In another exemplary embodiment of the disclosed systems, the one or more processors are configured to acquire real-time attitude information for each image.

In another exemplary embodiment of the disclosed systems, the one or more processors are configured to acquire the real-time attitude information as each image is captured.

In another exemplary embodiment of the disclosed systems, the real-time attitude information is acquired via an inertial measurement unit.

In another exemplary embodiment of the disclosed systems, the real-time attitude information is acquired via a gyroscope, an accelerometer, a global positioning system ("GPS") and/or a magnetometer.

Exemplary embodiments of the disclosed systems further comprise a storage device configured to store the images and the real-time attitude information.

In another exemplary embodiment of the disclosed systems, the storage device is a secure digital ("SD") card.

In another exemplary embodiment of the disclosed systems, the one or more processors are configured to send the images and the attitude information to a ground station.

In another exemplary embodiment of the disclosed systems, the one or more processors are configured to send the images and the attitude information to the ground station as the images are captured or stored.

In another exemplary embodiment of the disclosed systems, the one or more processors are configured to orient the imaging device to another desired attitude position according to the imaging scheme and capturing a next image at the other desired attitude position until each images defined in the imaging scheme are captured.

In another exemplary embodiment of the disclosed systems, the one or more processors are configured to:
point the imaging device at a preselected pitch angle that is perpendicular to the horizontal direction; and
capture the anchor image according to the imaging scheme.

In another exemplary embodiment of the disclosed systems, the one or more processors are configured to:
point the imaging device at a preselected pitch angle in the horizontal direction; and
capture an image according to the imaging scheme at a preselected yaw angle.

In another exemplary embodiment of the disclosed systems, the one or more processors are configured to:
successively point the imaging device to each of the rest yaw angles of the first pitch angle; and
capture respective images at each of the rest yaw angles according to the imaging scheme to acquire the number of images at the first pitch angle.

In another exemplary embodiment of the disclosed systems, the one or more processors are configured to:
point the imaging device to a successively selected upward pitch angle; and
capture an image according to the imaging scheme at a preselected yaw angle.

In another exemplary embodiment of the disclosed systems, the one or more processors are configured to:
point the imaging device to rest yaw angles at the selected upward pitch angle; and
capture respective images at each of the rest yaw angles according to the imaging scheme to acquire the number of images at the selected upward pitch angle.

In another exemplary embodiment of the disclosed systems, the number of images for the selected upward pitch angle comprises additional images to the number of images for the first pitch angle.

In another exemplary embodiment of the disclosed systems, the one or more processors are configured to:
point the imaging device at a successively selected downward pitch angle; and
capture an image according to the imaging scheme at a preselected yaw angle.

In another exemplary embodiment of the disclosed systems, the one or more processors are configured to:
orient the imaging device to rest yaw angles at the selected downward pitch angle; and
capture respective images at each of the rest yaw angles according to the imaging scheme to acquire the number of images at the selected downward pitch angle.

In another exemplary embodiment of the disclosed systems, the number of images for the selected downward pitch angle comprises additional images to the number of images for the first pitch angle.

In another exemplary embodiment of the disclosed systems, the one or more processors are configured to lower a resolution of the images.

In another exemplary embodiment of the disclosed systems, the one or more processors are configured to lower resolution in a horizontal direction and/or lowering resolution in a vertical direction of the image.

In accordance with another aspect disclosed herein, there is set forth a method for compositing a panorama image, comprising:
receiving an image and attitude information that is used by an imaging device to capture the image; and
stitching the received image to a compositing image based on the attitude information.

In an exemplary embodiment of the disclosed methods, receiving the image comprises receiving the image of a scene, wherein the compositing image is a panorama image of the scene being built on a compositing surface.

In another exemplary embodiment of the disclosed methods, stitching the received image comprises converting the received image to an equirectangular projection.

In another exemplary embodiment of the disclosed methods, converting the received image comprises determining that the received image is captured with a rectilinear lens.

In another exemplary embodiment of the disclosed methods, converting the received image comprises transforming the received image from a rectilinear projection to the equirectangular projection.

In another exemplary embodiment of the disclosed methods, transforming the received image comprises:

transforming the rectilinear projection to a spherical projection; and transforming the spherical projection to the equirectangular projection.

In another exemplary embodiment of the disclosed methods, the spherical projection is based on a spherical radius equal to a focal length of a lens of the imaging device.

In another exemplary embodiment of the disclosed methods, converting the received image comprises determining that the received image is captured with a fisheye lens.

In another exemplary embodiment of the disclosed methods, converting the received image comprises transforming the received image from a fisheye projection to the equirectangular projection.

In another exemplary embodiment of the disclosed methods, transforming the received image comprises:

transforming the fisheye projection to a spherical projection; and transforming the spherical projection to the equirectangular projection.

In another exemplary embodiment of the disclosed methods, the spherical projection is based on a spherical radius equal to a focal length of a lens of the imaging device.

Exemplary embodiments of the disclosed methods further comprise initiating the compositing image with an anchor image.

In another exemplary embodiment of the disclosed methods, initiating the compositing image comprises positioning the anchor image with corresponding attitude information for the anchor image.

In another exemplary embodiment of the disclosed methods, stitching the received image comprises stitching the received image to the compositing image that begins with the anchor image to incrementally construct the panorama image.

In another exemplary embodiment of the disclosed methods, stitching the received image comprises aligning the received image relative to the compositing image based on the attitude information.

In another exemplary embodiment of the disclosed methods, stitching the received image comprises micro-tuning the received image relative to the compositing image.

In another exemplary embodiment of the disclosed methods, micro-tuning the received image comprises micro-tuning at least one overlapping area between the received image and the compositing image.

In another exemplary embodiment of the disclosed methods, micro-tuning the overlapping area comprises forming the overlapping area between the received image and the compositing image by matching a portion of the received image and a portion of the compositing image.

In another exemplary embodiment of the disclosed methods, micro-tuning the overlapping area comprises determining searching scopes in a yaw direction, a pitch direction and/or a roll direction.

In another exemplary embodiment of the disclosed methods, determining the searching scopes comprises deciding a searching step length.

In another exemplary embodiment of the disclosed methods, determining the searching scopes comprises deciding numbers of searching steps for each of the yaw direction, the pitch direction and the roll direction.

In another exemplary embodiment of the disclosed methods, determining the number of steps comprises determining the number of steps based on a control error, a delay error and/or a vibration amplitude in a pitch deviation, a yaw deviation and a roll deviation respectively.

In another exemplary embodiment of the disclosed methods, micro-tuning comprises determining a matching cost for each combination of the searching step and the number of steps in each of the pitch direction, the yaw direction and the roll direction.

In another exemplary embodiment of the disclosed methods, determining the matching cost comprises calculating the matching cost via a sum of absolute differences ("SAD") measure or a normalized cross-correlation ("NCC") measure.

In another exemplary embodiment of the disclosed methods, micro-tuning comprises ascertaining an optimal combination of yaw-pitch-roll angles.

In another exemplary embodiment of the disclosed methods, stitching the received image comprises fusing the received image to the compositing image based on the optimal combination of yaw-pitch-roll angles.

In another exemplary embodiment of the disclosed methods, fusing the received image comprising fusing the received image to the compositing image via a blending algorithm.

In another exemplary embodiment of the disclosed methods, stitching the received image comprises conducting a global optimization toward at least a portion of the overlapping areas of the compositing image.

In another exemplary embodiment of the disclosed methods, the received image is captured according to a spherical panorama imaging scheme.

In another exemplary embodiment of the disclosed methods, at least a portion of the compositing image is constructed via a blending algorithm.

Exemplary embodiments of the disclosed methods further comprise blending algorithm is a Laplacian Pyramid Blending algorithm.

Exemplary embodiments of the disclosed methods further comprise lowering a resolution of the received image and/or lowering a resolution of the panorama.

In another exemplary embodiment of the disclosed methods, lowering the resolution of the received image comprises reducing resolution in a horizontal direction and/or lowering resolution in a vertical direction of the received image.

In another exemplary embodiment of the disclosed methods, lowering the resolution of the spherical panorama image comprises reducing resolution in a horizontal direction and/or lowering resolution in a vertical direction of the compositing image.

In accordance with another aspect disclosed herein, there is set forth a computer program product comprising instructions for constructing a panorama image, being configured to perform the constructing process in accordance with any one of previous embodiments of the disclosed methods.

In accordance with another aspect disclosed herein, there is set forth a system for constructing a panorama image, comprising:

a receiving unit that operates to:

receive an image and attitude information that is used by an imaging device to capture the image; and a processing unit that operates to:

convert the received image to an equirectangular projection, align the received image relative to a compositing image based on the attitude information, micro-tune the received image relative to the compositing image to acquire at least one overlapping area between the received image and the compositing image, and stitch the received image to the compositing image, wherein the compositing image is a panorama image being built on a compositing surface.

In accordance with another aspect disclosed herein, there is set forth an apparatus for constructing a panorama image, comprising:

one or more processors that are individually or collectively configured to:

receive an image and attitude information that is used by an imaging device to capture the image; and stitch the received image to a compositing image based on the attitude information.

In an exemplary embodiment of the disclosed apparatuses, the received image is the image of a scene, and the compositing image is a panorama image of the scene being built on a compositing surface.

In another exemplary embodiment of the disclosed apparatuses, the one or more processors are configured to convert the received image to an equirectangular projection.

In another exemplary embodiment of the disclosed apparatuses, the one or more processors are configured to determine that the received image is captured with a rectilinear lens.

In another exemplary embodiment of the disclosed apparatuses, the one or more processors are configured to transform the received image from a rectilinear projection to the equirectangular projection.

In another exemplary embodiment of the disclosed apparatuses, the one or more processors are configured to transform the rectilinear projection to a spherical projection, and to transform the spherical projection to the equirectangular projection.

In another exemplary embodiment of the disclosed apparatuses, the spherical projection is based on a spherical radius equal to a focal length of a lens of the imaging device.

In another exemplary embodiment of the disclosed apparatuses, the one or more processors are configured to determine that the received image is captured with a fisheye lens.

In another exemplary embodiment of the disclosed apparatuses, the one or more processors are configured to transform the received image from a fisheye projection to the equirectangular projection.

In another exemplary embodiment of the disclosed apparatuses, the one or more processors are configured to transform the fisheye projection to a spherical projection and to transform the spherical projection to the equirectangular projection.

In another exemplary embodiment of the disclosed apparatuses, the spherical projection is based on a spherical radius equal to a focal length of a lens of the imaging device.

In another exemplary embodiment of the disclosed apparatuses, the one or more processors are configured to initiate the compositing image with an anchor image.

In another exemplary embodiment of the disclosed apparatuses, the anchor image is positioned at the compositing image with corresponding attitude information for the anchor image.

In another exemplary embodiment of the disclosed apparatuses, the one or more processors are configured to stitch the received image to the compositing image that begins with the anchor image to incrementally construct the panorama image.

In another exemplary embodiment of the disclosed apparatuses, the one or more processors are configured to align the received image relative to the compositing image based on the attitude information.

In another exemplary embodiment of the disclosed apparatuses, the one or more processors are configured to micro-tune the received image relative to the compositing image.

In another exemplary embodiment of the disclosed apparatuses, the one or more processors are configured to micro-tune at least one overlapping area between the received image and the compositing image.

In another exemplary embodiment of the disclosed apparatuses, the one or more processors are configured to acquire the overlapping area between the received image and the compositing image by matching a portion of the received image and a portion of the compositing image.

In another exemplary embodiment of the disclosed apparatuses, the one or more processors are configured to determine searching scopes in a yaw direction, a pitch direction and/or a roll direction.

In another exemplary embodiment of the disclosed apparatuses, the searching scopes comprises a searching step length in the yaw direction, the pitch direction and/or the roll direction.

In another exemplary embodiment of the disclosed apparatuses, the searching scopes comprises numbers of searching steps for each of the yaw direction, the pitch direction and the roll direction.

In another exemplary embodiment of the disclosed apparatuses, the one or more processors are configured to determine the numbers of steps based on a control error, a delay error and/or a vibration amplitude in a pitch deviation, a yaw deviation and a roll deviation respectively.

In another exemplary embodiment of the disclosed apparatuses, the one or more processors are configured to determine a matching cost for each combination of the searching step and the number of steps in each of the pitch direction, the yaw direction and the roll direction.

In another exemplary embodiment of the disclosed apparatuses, the matching cost are calculated via a sum of absolute differences ("SAD") measure or a normalized cross-correlation ("NCC") measure.

In another exemplary embodiment of the disclosed apparatuses, the one or more processors are configured to ascertain an optimal combination of yaw-pitch-roll angles.

In another exemplary embodiment of the disclosed apparatuses, the one or more processors are configured to fuse the received image to the compositing image based on the optimal combination of yaw-pitch-roll angles.

In another exemplary embodiment of the disclosed apparatuses, the one or more processors are configured to fuse the received image to the compositing image via a blending algorithm.

In another exemplary embodiment of the disclosed apparatuses, the one or more processors are configured to conduct a global optimization toward at least a portion of the overlapping areas of the compositing image.

In another exemplary embodiment of the disclosed apparatuses, the apparatus is arranged on a mobile platform or in a ground station.

In another exemplary embodiment of the disclosed apparatuses, the received image is captured according to a spherical panorama imaging scheme In another exemplary embodiment of the disclosed apparatuses, the one or more processors are configured to blend the compositing image to form a spherical panorama image based on at least a portion of the compositing image via a blending algorithm.

In another exemplary embodiment of the disclosed apparatuses, the blending algorithm is a Laplacian Pyramid Blending algorithm.

In another exemplary embodiment of the disclosed apparatuses, the one or more processors are configured to lower a resolution of the received image and/or a resolution of the compositing image.

In another exemplary embodiment of the disclosed apparatuses, the one or more processors are configured to reduce resolution in a horizontal direction and/or resolution in a vertical direction of the received image.

In another exemplary embodiment of the disclosed apparatuses, the one or more processors are configured to reduce resolution in a horizontal direction and/or resolution in a vertical direction of the compositing image.

In accordance with another aspect disclosed herein, there is set forth an imaging method, comprising:

devising an imaging scheme for obtaining a spherical panorama image based on at least one imaging parameter; and automatically capturing a plurality of images according to the imaging scheme.

In an exemplary embodiment of the disclosed methods, devising the imaging scheme comprises constructing the imaging scheme based at least one parameter of an imaging device, a gimbal for coupling with the imaging device or a mobile platform associated with the imaging device.

In another exemplary embodiment of the disclosed methods, capturing the plurality of images comprises configuring at least one configurable parameters of the imaging device.

In another exemplary embodiment of the disclosed methods, capturing the plurality of images comprises orienting the imaging device to a desired attitude according to the imaging scheme; and acquiring the real-time attitude information as each image is captured.

Exemplary embodiments of the disclosed methods further comprise sending the each image and the real-time attitude information to a ground station when the image is captured.

Exemplary embodiments of the disclosed methods further comprise receiving the images and the real-time attitude information at the ground station.

Exemplary embodiments of the disclosed methods further comprise stitching the image to a panorama image based on the attitude information.

In another exemplary embodiment of the disclosed methods, stitching comprises stitching the images incrementally when the image is captured or received.

In another exemplary embodiment of the disclosed methods, stitching comprises aligning the image relative to the panorama image based on the attitude information; and micro-tuning the image relative to the panorama image based on a pitch deviation, a yaw deviation and/or a roll deviation.

In another exemplary embodiment of the disclosed methods, sending the images comprises lowering resolution of the image.

Exemplary embodiments of the disclosed methods further comprise reconfiguring at least one of the configurable parameters of the imaging device; and recapturing the image and the real-time attitude information.

In accordance with another aspect disclosed herein, there is set forth an imaging system, comprising:

one or more processors that are individually or collectively configured to:

devise an imaging scheme for obtaining a spherical panorama image based on at least one imaging parameter; and direct an imaging device to capture a plurality of images according to the imaging scheme.

In an exemplary embodiment of the disclosed systems, the one or more processors are configured to construct the imaging scheme based at least one parameter of an imaging device, a gimbal for coupling with the imaging device or a mobile platform associated with the imaging device.

In another exemplary embodiment of the disclosed systems, the one or more processors are configured to receive a command for configuring at least one configurable parameters of the imaging device.

In another exemplary embodiment of the disclosed systems, the one or more processors are configured to:

orient the imaging device to a desired attitude according to the imaging scheme, and acquire the real-time attitude information as each image is captured.

In another exemplary embodiment of the disclosed systems, the one or more processors are configured to send the image and the real-time attitude information to a ground station when the image is captured.

Exemplary embodiments of the disclosed systems further comprise a ground station configured to receive the images and the real-time attitude information.

In another exemplary embodiment of the disclosed systems, the ground station is configured to stitch the image to a panorama image based on the attitude information.

In another exemplary embodiment of the disclosed systems, the ground station is configured to stitch the images incrementally when the image received.

In another exemplary embodiment of the disclosed systems, the ground station is configured to align the image relative to the panorama image based on the attitude information, and micro-tune the image relative to the panorama image based on a pitch deviation, a yaw deviation and/or a roll deviation.

In another exemplary embodiment of the disclosed systems, the one or more processors are configured to lower resolution of the image before the image is sent.

In another exemplary embodiment of the disclosed systems, the one or more processors are configured to receive a command for reconfiguring at least one of the configurable parameters of the imaging device, and recapturing an image and the real-time attitude information.

The exemplary embodiments under this disclosure can advantageously devise an imaging scheme automatically based on certain imaging parameters. Additionally, the exemplary embodiments under this disclosure can advantageously capture, according to the imaging scheme, a plurality of images and acquire corresponding attitude information for forming a panorama image. The exemplary embodiments under this disclosure can also stitch the plurality images incrementally based on the acquired corresponding attitude information. The exemplary embodiments, thereby, can automatically perform a complete process for obtaining the panorama image, including, but not limited to, devising the imaging scheme, capturing the images and stitching the images to form the panorama image. Alternatively and/or additionally, the exemplary embodiments can also include a preview function, which allows an operator to reconfigure certain configurable parameters of the imaging device or to reconstruct the imaging scheme based on the preview.

Figure 1:
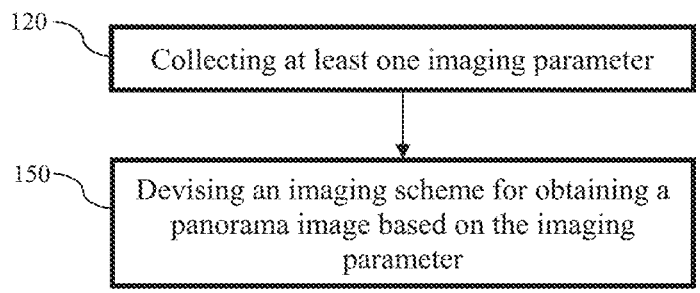
FIG. 1 is an exemplary top-level flow-chart illustrating an embodiment of a method for devising an imaging scheme for obtaining a panorama image based on imaging parameters.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

In currently-available approaches, an operator manually controls a gimbal and/or a UAV to orient an imaging device to various directions in order to capture images for constructing the panorama image. The images captured can be stitched via a software tool by matching feature points on each images and/or by estimating the imaging device's attitude information.

Several disadvantages exist in currently-available spherical panorama imaging approaches. First, manual control of imaging in various orientations can result in big margins of deviations, causing uncontrollable overlapping areas between adjacent images. The big deviation margins can be problematic because stable overlapping areas is crucial to ensure that images can be stitched together properly. Second, matching feature points with the software tool can often result in estimation failure of the attitude information, making manual intervention necessary for correction. Third, the currently-available spherical panorama imaging approaches often need a bundle adjustment using global optimization to estimate the attitude information of the imaging device. Therefore, the approaches can result in large calculation volume and memory requirements.

Since currently-available spherical panorama generating approaches require manual operations in imaging and stitching processes and need global optimization, a system and method for automatically capturing images for obtaining a panorama image and automatically stitching the images to form the panorama image can prove desirable and provide a basis for automatically constructing a panorama image. This result can be achieved, according to one embodiment as shown in FIG. 1.

FIG. 1 illustrates an exemplary embodiment of a method 100 for devising an imaging scheme. Turning to FIG. 1, the imaging scheme for obtaining a panorama image is shown as being devised based on imaging parameters. In FIG. 1, at least one imaging parameter, e.g., a plurality of imaging parameters, can be collected, at 120. The imaging parameters can include, for example, parameters of an imaging device 580, parameters of a gimbal 560 coupled with the imaging device 580 and/or a mobile platform 500 coupled with the imaging device 580 and/or the gimbal 560 (collectively shown in FIG. 20).

The imaging parameters can be collected via any applicable manner, such as, via manual inputs and/or automatic detection. In some embodiments, for example, the parameters of the imaging device 580 can be acquired by detecting a type of lens coupled with the imaging device 580. In other embodiments, the parameters of the gimbal 560 and/or the parameters of the imaging device 580 can be acquired by user inputs. The panorama image can be a spherical panorama image, particularly a three-hundred-sixty degree spherical panorama image. The spherical panorama image, for example, can cover three-hundred-sixty degrees in a horizontal plane as well as at least one-hundred-eighty degrees in a vertical plane with no blind spot.

At 150, the imaging scheme for obtaining the panorama image can be determined based on the collected imaging parameters. The imaging scheme can include a number of images to form the panorama image and attitude for capturing each image. The attitude can include, for example, a pitch angle and/or a yaw angle. The imaging scheme can be implemented in order to automatically and/or manually acquire the images for forming the panorama image.

Although shown and described as using the imaging parameters for purposes of illustration only, the imaging scheme can be devised based on additional suitable parameters, such as features of a scene, ambient conditions and the like.

The imaging scheme can be advantageously devised in an automatic manner, partially or in its entirety. The imaging scheme can implement panorama imaging and panorama image stitching with an automatic process, in a separate or combined manner. Implementation of the imaging scheme can advantageously avoid manual interventions and, thereby, can address issues caused by the manual interventions as described in the background.

Although shown and described as being an automatic process for purposes of illustration only, the process, for example the imaging process, can involve manual intervention, such as configuring configurable parameters of the imaging device 580.

Figure 2:
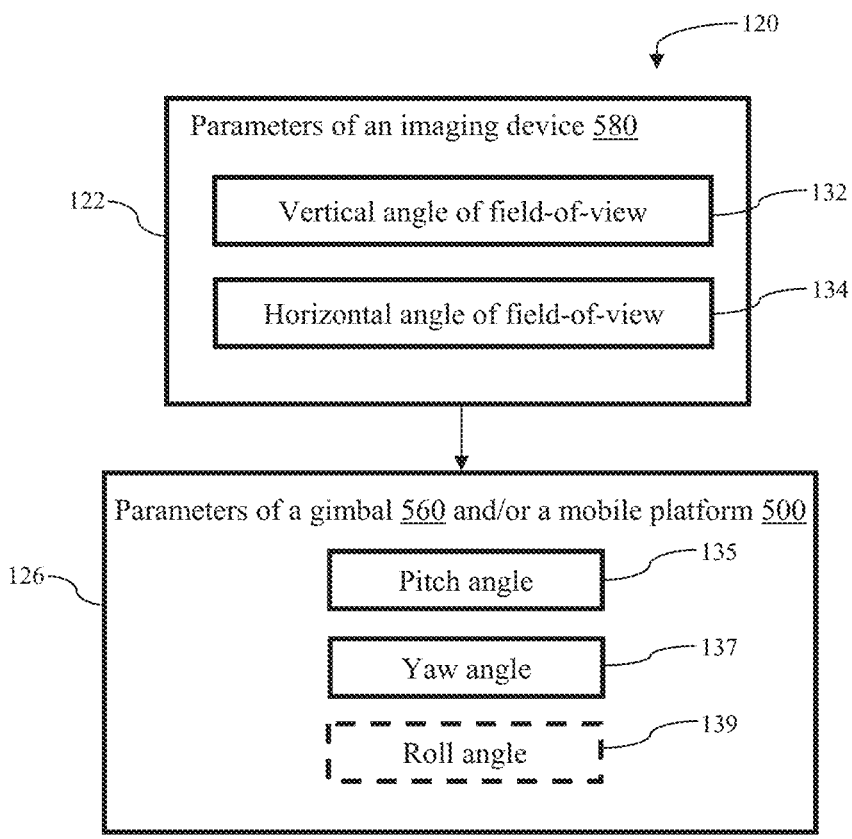
FIG. 2 is an exemplary flow-chart diagram illustrating an alternative embodiment of the method of FIG. 1, wherein the imaging parameters include parameters of an imaging device and parameters of a gimbal and/or a mobile platform.

FIG. 2 illustrates an alternative embodiment of the exemplary method 100. Turning to FIG. 2, the imaging parameters can include parameters of an imaging device 580, at 122. The imaging parameters can further include parameters of a gimbal 560 that is couple with the imaging device 580 and/or a mobile platform 500 that is coupled with the imaging device 580 and/or the gimbal 560.

In FIG. 2, the parameters of the imaging device 580 can comprise parameters of a lens 589 (shown in FIG. 6) attached to the imaging device 580. In some embodiments, the lens 589 can be a prime lens (or a fixed focal lens). The parameters 122 of the imaging device 580 can include angles of a field of view ("FOV") of the lens 560. The FOV can comprise at least a vertical angle of the FOV, at 132, and/or a horizontal angle of FOV, at 134. In some embodiments, the two angles 132, 134 can be acquired automatically based on a type of the lens and corresponding parameters. In other embodiments, the angles 132, 134 can be acquired by user inputs.

Although shown and described as being the prime lens for purposes of illustration only, the lens can comprise any other types of lens, such as a zoom lens. In some embodiments, when the zoom lens is used, the imaging parameters of the imaging device 580 can comprise a parameter reflecting a zoom length of the lens 589. The zoom length can be changeable and can affect FOV of the lens 589. Therefore, in case of the zoom lens, the FOV angles 132, 134 can be acquired based on a set of parameters, including, but not limited to, a maximum horizontal FOV angle, a minimum horizontal FOV angle, a maximum vertical FOV angle, a minimum horizontal FOV angle, a zoom range, a zoom length and the like.

The parameters 126 of the gimbal 560 and/or the mobile platform 500, for example, can comprise parameters regarding a pitch angle 135 and/or a yaw angle 137. Optionally, the parameters 126 can include a roll angle 139. In some embodiments, the gimbal 560 can enable the imaging device 580 to make a partial and/or complete horizontal rotation. The pitch angle 135 can be divided into an upward pitch angle and/or a downward pitch angle, being separated by a pitch horizontal direction. In some embodiments, the gimbal 560 can be restricted by a maximum pitch angle in at least one direction, e.g., the upward pitch angle. There can be a plurality of reasons for such limitation, such as mechanical restriction of the gimbal 560 and/or avoiding a fuselage of the mobile platform 500 etc.

In other embodiments, for example, when the gimbal 560 is not provided, the mobile platform 500 can be used to provide the pitch angle 135 and/or the yaw angle 137. In such embodiments, the imaging device 580 can have no limitation horizontally, i.e., the mobile platform 500 can enable the imaging device 580 to make a full horizontal rotation. However, as the gimbal 560, the mobile platform 500 can have limitations providing the pitch angle 135 in at least one direction, i.e., there can be a minimum pitch angle and/or a maximum pitch angle in either upward or downward direction. Reasons for such limitations can include, but is not limited to, mechanical restrictions of the mobile platform 500.

Although shown and described as providing the pitch angle 135 and/or the yaw angle 137 by either the gimbal 560 or the mobile platform 500 for purposes of illustration only, an operational combination of the gimbal 560 and the mobile platform 500 can also be applied to provide wider or otherwise different ranges of the pitch angle 135. Although shown and described as acquiring the pitch angle 135 and the yaw 137 for purposes of illustration only, other parameters 126 can be acquired in devising the imaging scheme, such as an optional parameter 139 regarding a roll angle 139, features of a scene, ambient conditions and the like.

Figure 3:
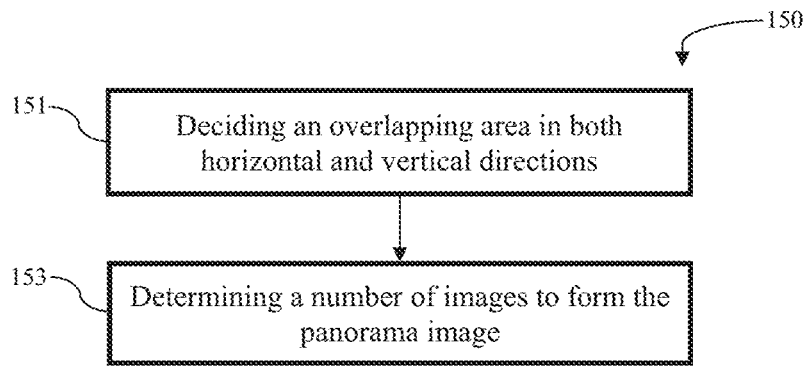
FIG. 3 is an exemplary flow-chart illustrating another alternative embodiment of the method of FIG. 1, wherein overlapping areas between adjacent images are decided while determining a number of images to form the panorama image.

FIG. 3 illustrates another alternative embodiment of the exemplary method 100. Turning to FIG. 3, the imaging scheme is devised by deciding overlapping areas in a horizontal direction and/or a vertical direction and determining a number of images to form the panorama image. As shown in FIG. 3, the devising the imaging scheme for obtaining the panorama image, at 150, can comprise deciding the overlapping areas in the horizontal direction and/or the vertical direction, at 151.

As described in the background section, sufficient overlapping area can be necessary for stitching images together to form the panorama image. The imaging scheme can be devised to maintain enough overlapping area, at 151, between any two images that are adjacent, in the horizontal direction and/or in the vertical direction. For purposes of deciding the overlapping areas between the images, in some embodiments, a sufficient number of images can be acquired in the horizontal direction and/or the vertical direction.

The overlapping area between two vertically adjacent images can be secured in such an approach that a height of the overlapping area is not less than a predetermined ratio to a height of any of the two adjacent images. The overlapping area between two horizontally adjacent images can be secured in such an approach that a width of the overlapping area is not less than a predetermined ratio to a width of any of the adjacent images. The predetermined ratio being used for the two vertically adjacent images and/or the two horizontally adjacent image can be in a range of ten percent to forty percent, such as a range of twenty percent to thirty percent or a value of twenty-five percent.

Although shown and described as using the height of the two vertically adjacent images for determining the overlapping area for purposes of illustration only, other characteristics of the images can also be used, such as the area of any of the vertically adjacent images. Although shown and described as using the width of the two horizontally adjacent images for determining the overlapping area between the two images for purposes of illustration only, other characteristics of the images can also be used, such as the area of any of the horizontally adjacent images.

As shown in FIG. 3, the devising the imaging scheme, at 150, can comprise determining the number of images to form the panorama image, at 153. Basically, there can be two concepts for devising the imaging scheme: one is to decide enough overlapping areas between adjacent images, and the other one is to keep the number of images as low as possible for reducing stitching costs. Therefore, at 153, the number can be determined as the lowest number of images to maintain a minimum predetermined overlapping area between adjacent images.

Although shown and described as deciding the predetermined overlapping area between adjacent images for purposes of illustration only, the overlapping area can be decreased and/or increased based on certain factors, including, but not limited to, territorial features and/or pitch angle parameter etc. In practice, the theoretically-determined number of images can be increased and/or decreased for providing certain margins.

Figure 4:
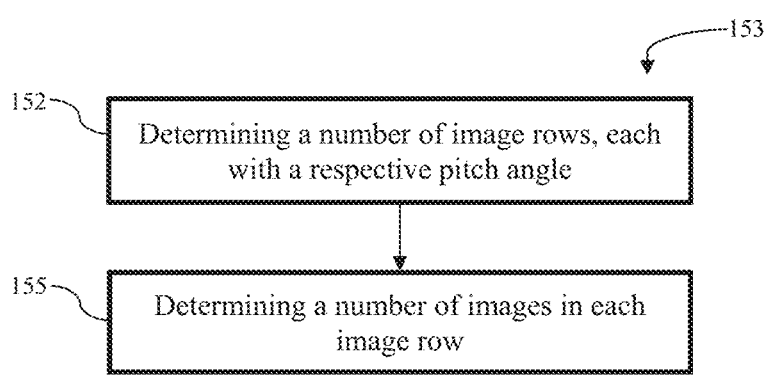
FIG. 4 is another exemplary flow-chart diagram illustrating another alternative embodiment of the method of FIG. 1, wherein the imaging scheme is devised by determining a number of images rows and a number of images in each image row.

FIG. 4 illustrates an alternative embodiment of the exemplary method 100. Turning to FIG. 4, the imaging scheme of FIG. 1 is devised by determining a number of image rows and a number of images in each image row. The number of images can be the same and/or different between selected image rows. As shown in FIG. 4, the number of image rows can be determined, at 152. Each image row can associate with a corresponding pitch angle. In some embodiments, an image row at a pitch horizontal direction can be determined as a first row. Rows with pitch angles greater than the pitch horizontal direction can be determined based on the first row to cover at least partially areas above the first row. Additional detail regarding determining the number of image rows will be provided below with reference to FIGS. 16, 17. Rows with pitch angles less than the pitch horizontal direction can be determined based on the first row to cover, at least partially, areas below the first row.

Although shown and described as determining rows below the first row after the rows above the first row for purposes of illustration only, the image rows below the first row and the image rows above the first row can be determined in any order with no restriction. Although shown and described as covering the areas below the first row with enough image rows below the first row for purposes of illustration only, an anchor image can be provided to cover either a bottom portion or a top portion of the panorama image.

The number of images in each image row can be determined, at 155. In some embodiments, the number of images for each image row can be determined once an image row is determined. In some other embodiments, the number of images for each image row can be determined when the image rows are determined. In some embodiments, the imaging scheme can be finalized with a global optimization after at least partial image rows and the number of images are determined.

Although shown and described as each image row being in the horizontal direction for purposes of illustration only, the image rows can also be place in vertical directions. In such case, each image row can correspond a yaw angle and each image in any of the image row can correspond a pitch angle.

Figure 5:
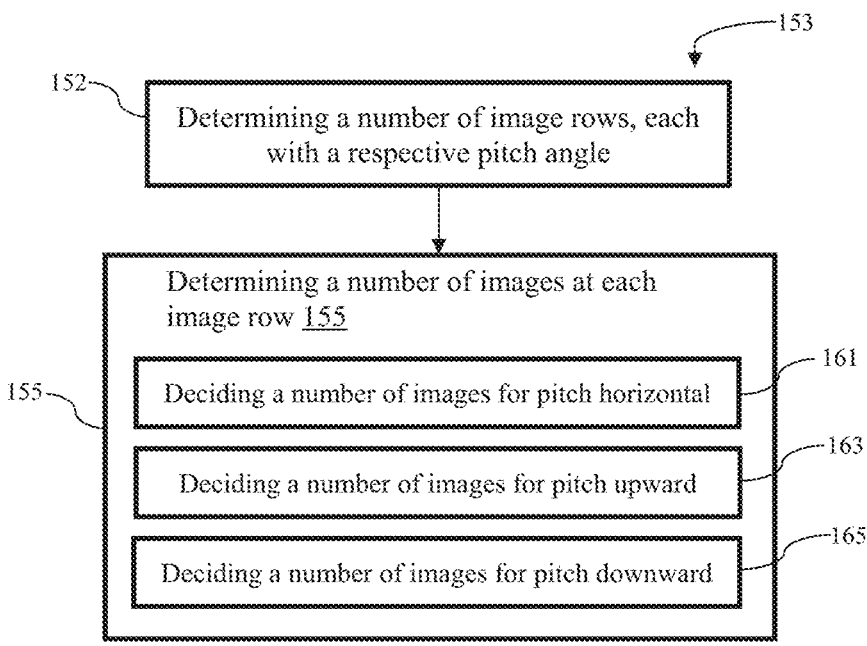
FIG. 5 is an exemplary flow-chart diagram illustrating an embodiment of the method of FIG. 4, wherein the number of images in each image row is determined at pitch horizontal, pitch upward and pitch downward.

FIG. 5 illustrates an alternative embodiment of the exemplary method 100. Turning to FIG. 5, the number of images in each image row is determined at pitch horizontal, pitch upward and pitch downward. As shown in FIG. 5, when a number of image rows is determined, at 152, the number of images in each image row can be determined, at 155.

The number of images in each image row can be determined in any order of the image rows. In some embodiments, the number of images in a first row (or a first pitch position) at a pitch horizontal direction can be determined first, at 161, based on the parameters of an imaging device 580. The number of images in the first row can guaranty the predetermined overlapping area defined with reference to FIG. 3 between adjacent images in the first row. Because there can be horizontally adjacent images for the first row, horizontal overlapping areas can be decided. When the number of images in the first row is determined, the images can be evenly distributed along the pitch horizontal direction, and each image can be assigned with a corresponding yaw angle.

At 163, the number of images in each image row above the first row can be decided. At 165, the number of images in each image row below the first row can be decided. Additional detail regarding determining the number of the images in each image row will be shown and described below with reference to FIGS. 16, 17. In some embodiments, for each image in any image row above or below the first row, overlapping areas between horizontally adjacent images need to be decided in manner shown and described with reference to FIG. 3. When the number of images in any selected image row above or below the first row is determined, the images can be evenly distributed along a latitude circle of the selected image row, and each image can be assigned with a corresponding yaw angle.

Although shown and described as deciding overlapping areas between horizontally adjacent images for purposes of illustration only, in some embodiments, overlapping areas between vertically adjacent images can be decided.

As shown and described with reference to FIG. 2, the imaging scheme can be constructed based on the imaging parameters. Such imaging parameters can include, but are not limited to, parameters of the imaging device 580 and parameters of the a gimbal 560 that is couple with the imaging device 580 and/or a mobile platform 500 that is couple with the imaging device 580 and/or the gimbal 560. The parameters of the imaging device 580 can include an FOV of a lens coupled with the imaging device 580. FIGS. 6-19 illustrate embodiments of an exemplary method 200 that the method of FIG. 1 implements.

Figure 6:
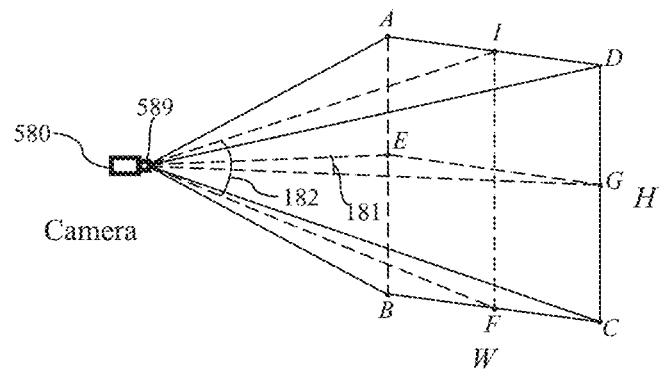
FIG. 6 is a schematic diagram illustrating an embodiment of an imaging device implementing the method of FIG. 1, wherein the imaging scheme couples with a lens with a field of view ("FOV").

FIG. 6 shows an embodiment of the exemplary method 200. Turning to FIG. 6, the imaging device 580 couples with a lens 589 that has an FOV. In FIG. 6, the FOV of the lens 589 can have a horizontal FOV $\theta_{hor}$ 181 and a vertical FOV $\theta_{ver}$ 182. Images captured via the lens 589 can have any predetermined shape, such as a rectangular shape. The rectangular shaped image can be converted to equirectangular projection for stitching together to form a panorama image. The equirectangular projection can be distorted in an exemplary shape as shown and described herein.

The horizontal FOV 181 and the vertical FOV 182 of the lens 589 are referred as the imaging device 580 being oriented in a horizontal direction. When the imaging device 580 is oriented in other directions, the horizontal FOV 181 can be not in the horizontal direction and/or the vertical FOV 182 can be not in the vertical direction.

Figure 7:
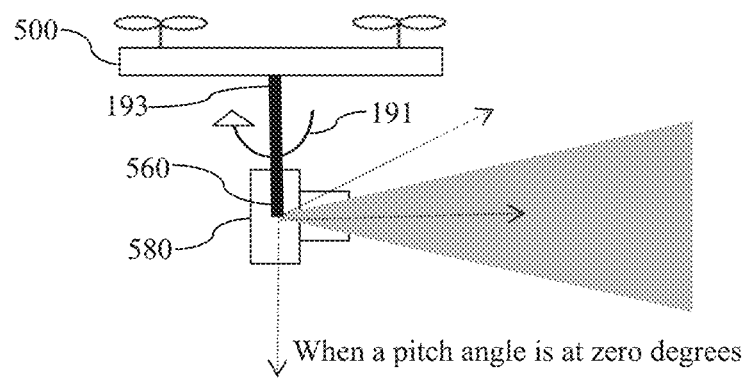
FIG. 7 is a schematic diagram illustrating an alternative embodiment of the method of FIG. 6, wherein the imaging device is shown as being able to make a full rotation in a horizontal direction at a pitch zero degrees.

FIG. 7 shows an alternative embodiment of the exemplary method 100. Turning to FIG. 7, the imaging device 580 can make the full rotation 191, in a horizontal direction, about a vertical axis 193, i.e., when a pitch angle is at zero degrees. The imaging device 580 can rotate about the axis 193 at other pitch angles.

The rotation about the vertical axis 193 can be accomplished with a carrier such as a gimbal 560 and/or a mobile platform 500. In some embodiments, the gimbal 560 can be coupled with the imaging device 580 to provide the imaging device 580 controllable orientation capacities. In such embodiments, the gimbal 560 alone can orient the imaging device 580 to any yaw angle about the axis 191 at any pitch angle. In other words, the gimbal 560 can orient the imaging device 580 to a desired attitude, including a desired pitch angle and/or a desired yaw angle.

Although shown and described as using the gimbal 560 for purposes of illustration only, the mobile platform 500 can also be used, individually or combined with the gimbal 560, to provide the horizontal rotation about the axis 193.

Although shown and described as being rotated about the vertical axis 193 for purposes of illustration only, the imaging device 580 can rotate about any yaw axis (not shown) that can be either a vertical axis or a non-vertical axis. In some embodiments, the yard axis can be perpendicular relative to the mobile platform 500, but not perpendicular to the ground because the mobile platform 580 itself can be not leveled. In such cases, the zero degrees of the pitch angle can refer to a plane that is perpendicular to the yaw axis. The imaging device 580 can rotate about the yaw axis at selected pitch angles. Each of the selected pitch angles can be relative to the plane.

For purposes of ensuring the predetermined horizontal overlapping area, a number $M_0$ of images in a full rotation at pitch zero degrees can be calculated based the horizontal FOV $\theta_{hor}$ 181 (shown in FIG. 6):

$$M_0 = \left\lceil \frac{360}{(1-\sigma)\theta_{hor}} \right\rceil \quad \text{Equation (1)}$$

Wherein, $\sigma$ represents a ratio of an overlapping area to any of two horizontally adjacent images. $\sigma$ can be, for example, one-fourth of a width of any one of the two horizontally adjacent images, or one-fourth of an area any one of the two horizontally adjacent images. In some embodiments, $\sigma$ can be either decreased or increased to adjust the predetermined horizontal overlapping area. For example, $\sigma$ can be a value within a range between one-eighth and one-half. When $\sigma$ is one-fourth, Equation (1) can be:

$$M_0 = \left\lceil \frac{360}{\frac{3}{4}\theta_{hor}} \right\rceil \quad \text{Equation (2)}$$

A number of images for an image row at a pitch angle greater than zero degrees, i.e., pitch upwardly above the horizontal direction, can be calculate as:

$$M_{1i}(i \in (0, N_1))  \quad \text{Equation (3)}$$

Figure 8:
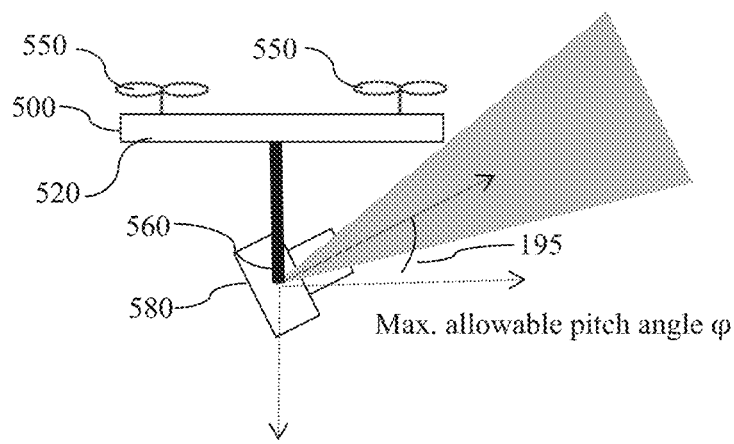
FIG. 8 is a schematic diagram illustrating another alternative embodiment of the method of FIG. 6, wherein the imaging device is shown as having a maximum allowable pitch angle.

FIG. 8 illustrates an alternative embodiment of the imaging setting for the exemplary method 100.

In some embodiments, the imaging device 580 can pitch ninety degree in an upward direction and/or pitch ninety degree in a downward directions. In such cases, for either the upward pitch direction or the downward pitch direction, a number N of image rows can be calculated based the vertical FOV $\theta_{ver}$ 182 (shown in FIG. 6):

$$N = \left\lceil \frac{90}{\frac{3}{4} \theta_{ver}} \right\rceil \quad \text{Equation (4)}$$

However, the pitch angle of the imaging device 580 can be restricted in at least one direction. Turning to FIG. 8, the imaging device 580 has a maximum allowable pitch angle 195. In FIG. 8, the maximum allowable pitch angle can be an upward pitch angle. The upward pitch angle can be an angle between an optical axis of the imaging device 580 and a plane that is perpendicular to a vertical axis 560 that can be perpendicular relative to a mobile platform 500, but not perpendicular to the ground.

A purpose for this restriction can be to avoid including any part of a fuselage 520 and/or propellers 550 of the mobile platform 500 in a panorama image. Therefore, a limitation for the maximum allowable pitch angle 195 can be the fuselage 520 and/or the propellers 550. Supposing the maximum allowable pitch angle 195 is represent by φ.

For purposes of ensuring the predetermined vertical overlapping area, a number $N_1$ of image rows for upward pitch can be calculated based on the maximum pitch angle φ and the vertical FOV $\theta_{ver}$ 182 (shown in FIG. 6):

$$N_1 = \left\lceil \frac{\varphi}{\frac{3}{4} \theta_{ver}} \right\rceil \quad \text{Equation (5)}$$

Similarly, when the pitch downward direction is restricted by, for example, the fuselage 520 and/or the propellers 550, the number $N_1$ of image rows for downward pitch can also be calculated via Equation (4), where the pitch angle φ represents a maximum allowable pitch angle in the downward direction.

In some embodiments, image stitching can be performed under an equirectangular projection, where a surface of a globe can be spread out to a plane. The projection maps meridians to vertical straight lines (longitude lines) of constant spacing, and circles of latitude to horizontal straight lines of constant spacing. Shape distortions can occur when an image is mapped to the equirectangular projection.

Figure 9:
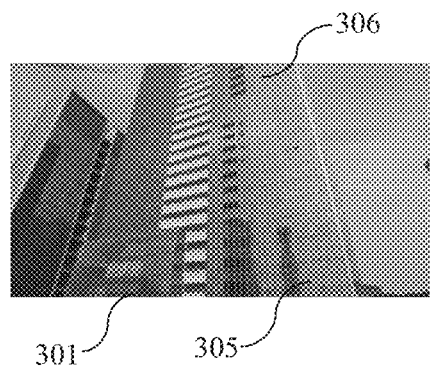
FIG. 9 is an exemplary image showing the image in a rectilinear projection, wherein the image is captured at an upward pitch angle.
Figure 10:
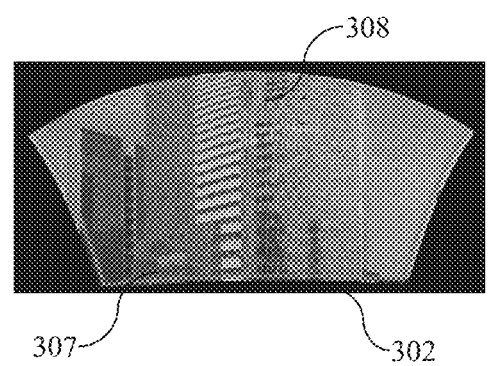
FIG. 10 is an exemplary image showing the image of FIG. 9 in an equirectangular projection.
Figure 11:
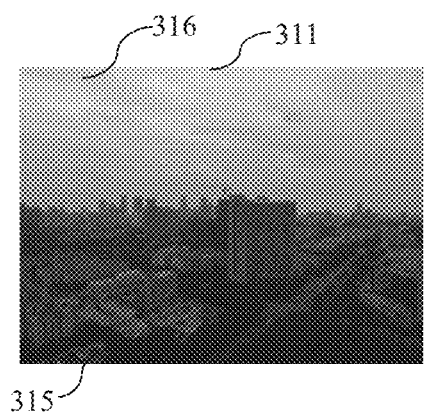
FIG. 11 is an exemplary image showing the image in a rectilinear projection, wherein the image is captured at a pitch horizontal direction.
Figure 12:
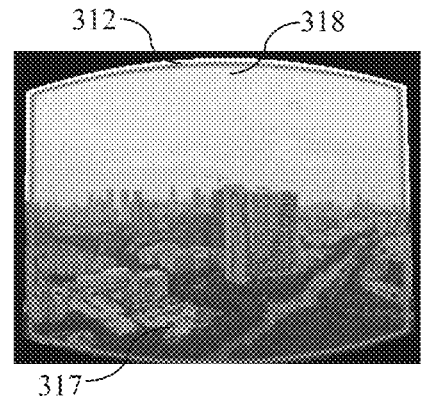
FIG. 12 is an exemplary image showing the image of FIG. 11 in an equirectangular projection.

FIGS. 9-14 illustrate images captured with a rectilinear lens at various pitch angles and converted into equirectangular projections respectively. For example, FIG. 9 shows an image captured at a pitch upward direction and FIG. 10 shows an equirectangular projection of FIG. 9. FIG. 11 shows an image captured at a pitch horizontal direction and FIG. 12 shows an equirectangular projection of FIG. 11.

Figure 13:
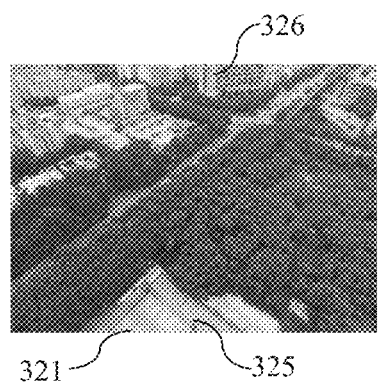
FIG. 13 is an exemplary image showing the image in a rectilinear projection, wherein the image is captured at a downward pitch angle.
Figure 14:
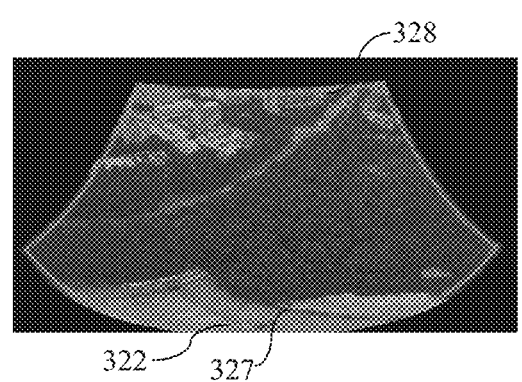
FIG. 14 is an exemplary image showing the image of FIG. 13 in an equirectangular projection.

FIG. 13 shows an image captured at a pitch downward direction and FIG. 14 shows an equirectangular projection of FIG. 13.

FIG. 10 illustrates an exemplary equirectangular projection of an image in a rectilinear projection of FIG. 10. Turning to FIG. 9, the image 301 can be an image captured via a rectilinear lens (not shown) in a pitch upward direction. In some embodiments, the captured image can include certain distortions. The image 301 can be a rectified image acquired by rectifying the captured image. Therefore, the image 301 can be in the rectilinear projection that can map straight lines to straight lines.

Turning to FIG. 10, the image 301 of FIG. 9 is converted into an image 302 in an equirectangular projection. In FIG. 10, the image 302 indicates that the image 301 can have been captured with an upward pitch angle, i.e., a pitch angle greater than zero degrees. In FIG. 9, for example, the pitch angle can be thirty degrees. In such case, a top portion 306 of the image 301 can correspond to longitude lines with less spacing than a bottom portion 305, therefore, the top portion 306 can cover more longitude lines than the bottom portion 305. As a result, in FIG. 10, the image 302 in the equirectangular projection can have a distortion with the top portion 308 of the image 302 can be wider than the bottom portion 307 of the image 302.

FIG. 12 illustrates an exemplary equirectangular projection of an image in a rectilinear projection of FIG. 11. Turning to FIG. 11, the image 311 can be an image captured via a rectilinear lens (not shown) in a pitch horizontal direction. In some embodiments, the captured image can include certain distortions. The image 311 can be rectified to correct the distortions.

Turning to FIG. 12, the image 311 of FIG. 11 is converted into an image 312 in an equirectangular projection. In FIG. 12, the image 312 indicates that the image 311 can have been captured with a first pitch position (or the horizontal direction), i.e., a pitch angle zero degrees. In such case, a bottom portion 315 of the image 311 can correspond to longitude lines with approximately identical spacing as a top portion 316, therefore, the bottom portion 215 can cover approximately same number of longitude lines as the top portion. As a result, the image 312 in the equirectangular projection can have a similar or same width at both a bottom portion 317 of the image 312 and the top portion 318 of the image 312.

FIG. 14 illustrates an exemplary equirectangular projection of an image in a rectilinear projection of FIG. 13. Turning to FIG. 13, the image 321 can be an image captured via a rectilinear lens (not shown) at a pitch downward angle. In some embodiments, the image captured via the rectilinear lens can include certain distortions. The image 321 can be rectified to correct the distortions.

Turning to FIG. 14, the image 322 of FIG. 13 is converted into an image 322 in an equirectangular projection. In FIG. 14, the image 322 indicates that the image 321 can have been captured at the downward pitch angle, i.e., a pitch angle less than zero degrees. In FIG. 13, as an example, the pitch angle can be negative forty-five degrees. In such case, a bottom portion 325 of the image 321 can correspond to longitude lines with less spacing than a top portion 326, therefore, the bottom portion 325 can cover more longitude lines than the top portion 326. As a result, the image 322 in the equirectangular projection can have a distortion with the bottom portion 327 of the image 322 is wider than the top portion 328 of the image 322.

Figure 15:
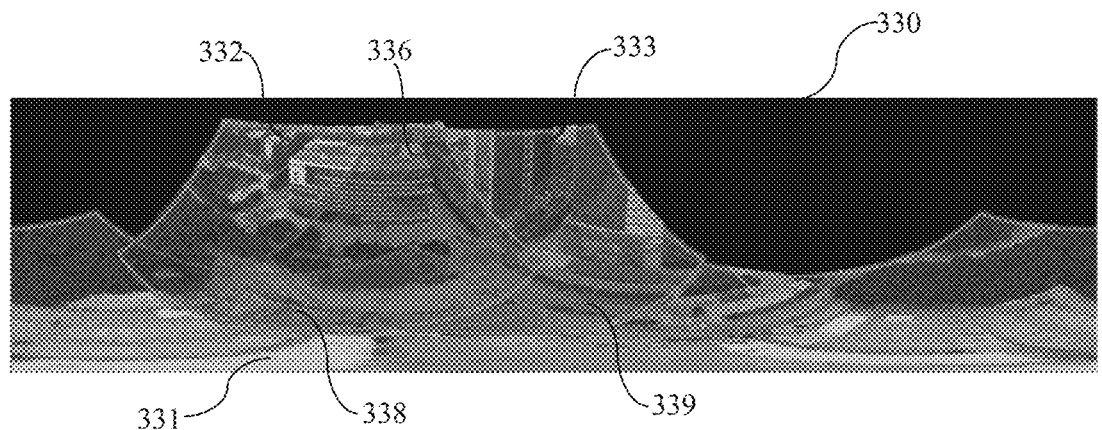
FIG. 15 is an illustrative image showing another alternative embodiment of the method of FIG. 6, wherein three images are overlapped to form a panorama image in the equirectangular projection.

FIG. 15 shows an embodiment of the exemplary method 200. Turning to FIG. 15, three images 331, 332, 333 are overlapped to form a panorama image 330 in the equirectangular projection. In FIG. 15, the panorama image 330 is shown as partially constructed. One or more images can be positioned to the panorama image 330 in an incremental manner. A first image 331 of the three images can be an anchor image that is positioned at a bottom of the panorama image 330. A second image 332 and a third image 333 can be captured for stitching to each other and/or each to the first image 331.

For purposes of ensuring a satisfactory stitching result, the images 332, 333 can have an overlapping area that is not less than a predetermined measurement, such as overlapping area 336. In some embodiments, between vertically adjacent images 331, 332, an overlapping height can be ensured with a predetermined measurement not less than a height of any of the two adjacent images 331, 332. Between two horizontally adjacent images 332, 333, an overlapping width can be ensured with a predetermined ratio not less than a width of any of the two adjacent images 332, 333. The predetermined ratio can be, for example, one fourth for both of the overlapping height and the overlapping width. In some embodiments, the predetermined ratio can be different for the overlapping height and for the overlapping width.

In some other embodiments, the predetermined measurement can be ensured by an area ratio of the overlapping area to any of the adjacent images. For example, the overlapping area, such as 336, 339, between any two adjacent images, either horizontally, such as 332, 333, or vertically, such as 331, 33, can be not less than a predetermined area ratio of the overlapping area to any of the two images. Such predetermined area ratio can be, for example, one fourth for both horizontally adjacent images, such as 332, 333, and vertically adjacent images, such as 331, 332. In some other embodiments, the predetermined ratio can be different for the horizontally adjacent images, such as 332, 333, and the vertically adjacent images, such as 331, 332.

For purposes of panorama imaging, particularly spherical panorama imaging, angle coverages in both a pitch direction and a yaw direction can be decided in devising the imaging scheme. In a common imaging setting, the imaging device 580 of FIG. 6 can make a full rotation horizontally.

For purposes of determining a number of images needed, for example a number of images in a latitude circle, an angle coverage of an image can be needed.

Figure 16:
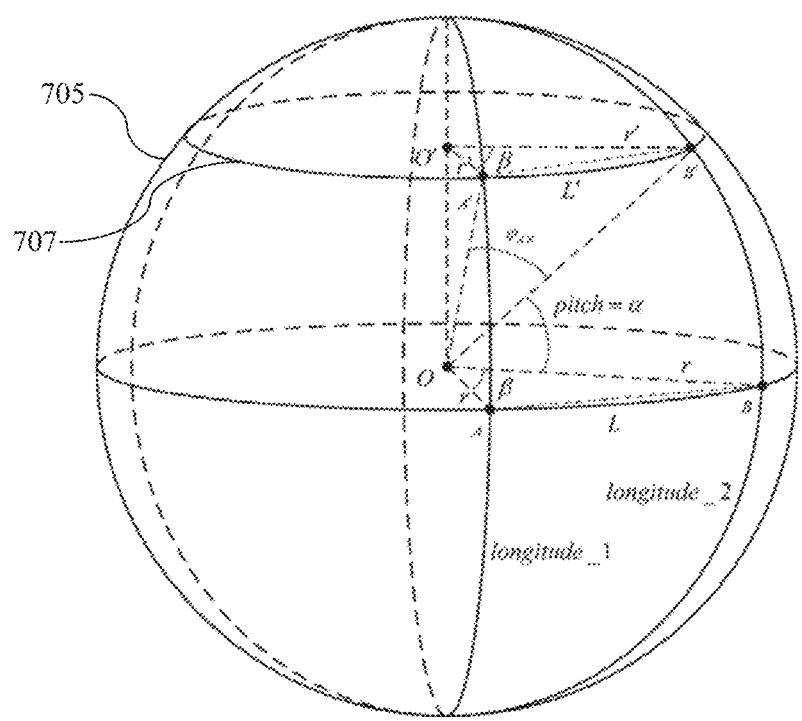
FIG. 16 is a schematic diagram illustrating an alternative embodiment of the method of FIG. 6, wherein the range of angle coverage by an image captured by the imaging device is illustrated in a global view.

FIG. 16 illustrates an alternative embodiment of the exemplary method 200. Turning to FIG. 16, the range of angle coverage by an image captured by the imaging device 580 of FIG. 6 is illustrated in a global view. As shown in FIG. 16, the imaging device 580 can be positioned at a center O of a globe 705. The globe is shown as having radius r. A surface of the globe 705 can be sectioned by longitude lines and latitude lines (or circles).

A first longitude line can be represented by longitude_1, and a second longitude line can be represented by longitude_2. The first and second longitude lines can be separated by a longitude angle β that can be any value within a range of zero degrees to one hundred and eighty degrees, inclusive. An arc section between the first and second longitude lines can have a length L. When a light ray enters the imaging device 580 at a pitch angle α, the pitch angle α can correspond to a horizontal section circle 707. The horizontal section circle 707 can have a radius r'. An arc section of the horizontal section circle 707 between first and second longitude lines can have a length L'. Following relationship can exist:

$$r' = r \cos \alpha \quad \text{Equation (6)}$$

Because a triangle OA'B' and a triangle O'A'B' are two isosceles triangles with a common base, following relationship can exist:

$$2 r' \sin\frac{\beta}{2} = 2r \cos\frac{\varphi_{A'B'}}{2} \quad \text{Equation (7)}$$

Then, following relationship can be deduced from the above relationship:

$$\varphi_{A'B'} = 2\arcsin\left(\cos\alpha \, \sin\frac{\beta}{2}\right) \quad \text{Equation (8)}$$

Equivalently, following relationship can exist:

$$\beta = 2 \arcsin\left(\frac{\sin\frac{\varphi_{A'B'}}{2}}{\cos\alpha}\right) \quad \text{Equation (9)}$$

Figure 17:
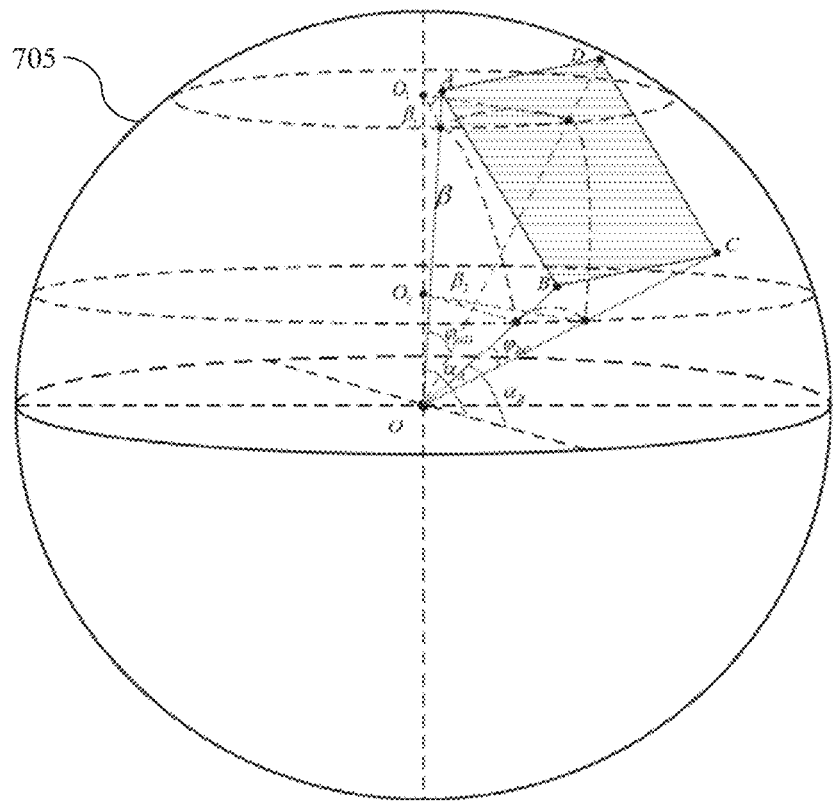
FIG. 17 is a schematic diagram illustrating another alternative embodiment of the method of FIG. 6, wherein a space imaging plane of the imaging device is shown as the imaging device being at an upward pitch angle.

FIG. 17 illustrates another alternative embodiment of the exemplary method 200. Turning to FIG. 17, a space imaging plane of the imaging device 580 of FIG. 6 is shown as the imaging device 580 being at an upward pitch angle. In FIG. 17, the space imaging plane can be illustrated as a shaded area ABCD, four points on a spherical surface of a globe 705. A corresponding space spherical area can be a curved area defined by the four points on the spherical surface.

According to Equation (1), a number of images needed for the upward pitch angle can be determined as:

$$M_0 = \text{MAX}\left(\left\lceil\frac{360}{\frac{3}{4}\beta 1}\right\rceil, \left\lceil\frac{360}{\frac{3}{4}\beta 2}\right\rceil\right) \quad \text{Equation (10)}$$

where, $\beta_1$ refers to an angle between two lines in a section plane, corresponding to the upper two sides of the shaded area ABCD; and $\beta_2$ refers to an angle between two lines in a section plane, corresponding to the lower two sides of the shaded area ABCD.

Figure 18:
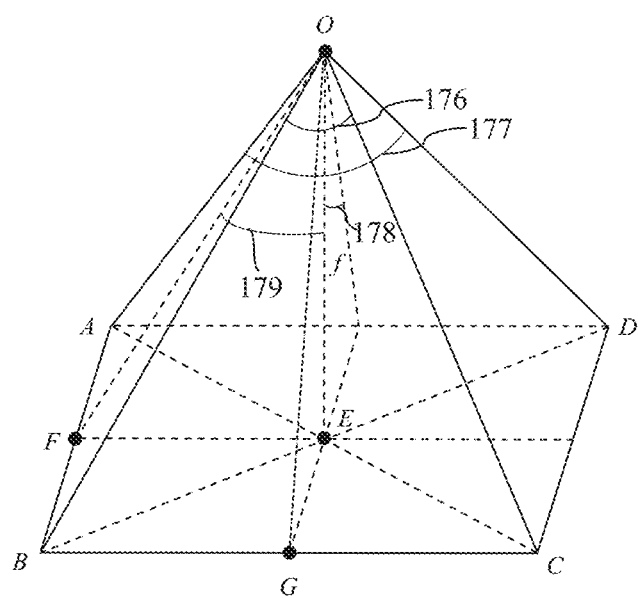
FIG. 18 is another schematic diagram illustrating another alternative embodiment of the method of FIG. 6, wherein two projected angles are determined via deduction.

FIG. 18 illustrates another alternative embodiment of the exemplary method 200. Turning to FIG. 18, the two projected angles $\beta_1$ and $\beta_2$ of Equation (8) can be determined via deduction. In FIG. 18, O represents an optic center of a lens 589 of the imaging device 580 of FIG. 6. Supposing a sensor (not shown) associated with the lens 589 be represented as ABCD, with measurements of W×H, wherein W represents a width of the sensor and H represents a height of the sensor. Following relationships can exist: AD=BC=W and AB=DC=H.

In FIG. 18, a $FOV_{hor}/2$ represents "a half of a horizontal FOV" 179 that the imaging device 580 can capture; a $FOV_{ver}/2$ represents "a half of a vertical FOV" 178 that the imaging device 580 can capture. E, F and G represent midpoints of sides of the area ABCD respectively. f represents a focal length of the lens 589 of the imaging device 580. The FOV of the sensor has a first horizontal-direction (width direction) base line $\varphi_{AD}$ 177 and a second horizontal-direction (width direction) base line $\varphi_{BC}$ 176.

According to a projection model of the imaging device 580, taking a rectilinear lens as an example, following relationships can exist:

$$\begin{cases} f\tan\left(\dfrac{FOV_{hor}}{2}\right) = \dfrac{W}{2} \\ f\tan\left(\dfrac{FOV_{ver}}{2}\right) = \dfrac{H}{2} \end{cases} \qquad \text{Equation (11)}$$

A physical coordinates $(x_i, y_i)$ of a point of an image can be converted to a unified three-dimensional coordinate by following relationships:

$$\begin{cases} x_w = \dfrac{x_i - W/2}{f} \\ y_w = \dfrac{y_i - H/2}{f} \\ z_w = -1 \end{cases} \qquad \text{Equation (12)}$$

When the imaging device 580 rotates in a yaw, pitch and/or roll direction, a conversion, or a rotation matrix, of the three-dimensional coordinates can be calculated. A sequence order of the yaw, pitch and roll can depend on a specific mechanical configuration of a device, such as a gimbal, that carries the imaging device 580. Such sequence order can be yaw-pitch-roll, pitch-yaw-roll, yaw-roll-pitch etc., which order can lead to various rotation matrixes. In some embodiments, for example, the sequence order can be set to yaw-roll-pitch. In such cases, the rotation matrix of the three-dimensional coordinate can be calculated using the following rotation matrix:

$$M = \begin{pmatrix} \cos Y \cos R & \sin R & -\sin Y \cos R \\ -\cos Y \sin R \cos P + \sin Y \sin P & \cos P \cos R & \sin Y \sin R \cos P + \sin P \cos Y \\ \cos Y \sin R \sin P + \sin Y \cos P & -\cos R \sin P & -\sin Y \sin R \sin P + \cos Y \cos P \end{pmatrix} \qquad \text{Equation (13)}$$

In other embodiments, the sequence order can be not yaw-roll-pitch, therefore, the rotation matrix can be different.

With the rotation matrix, the converted three-dimensional coordinates $(x_w', y_w', z_w')$ can be calculated as follows:

$$\begin{pmatrix} x_w' \\ y_w' \\ z_w' \end{pmatrix} = M \begin{pmatrix} x_w \\ y_w \\ z_w \end{pmatrix} \qquad \text{Equation (14)}$$

Figure 19:
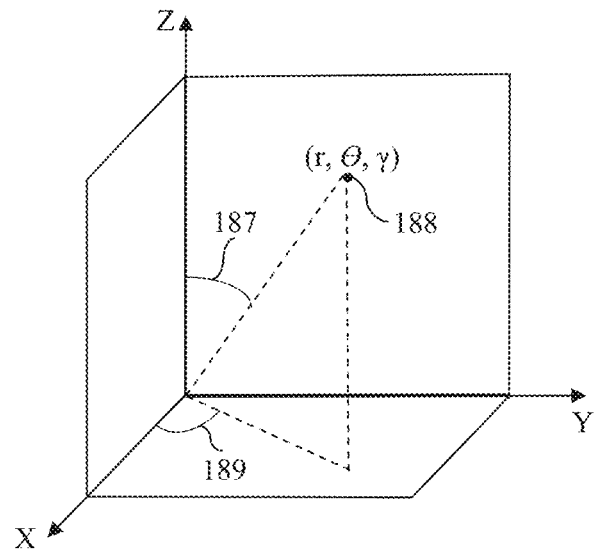
FIG. 19 is another schematic diagram illustrating another alternative embodiment of the method of FIG. 6, wherein a point with spherical coordinates is converted to a three-dimensional coordinate.

FIG. 19 illustrates an alternative embodiment for the exemplary method 200. Tuning to FIG. 19, a point with spherical coordinates is converted to a three-dimensional coordinate. In FIG. 19, the point 188 can have the spherical coordinates $(r, \theta, \gamma)$. A conversion from the spherical coordinates to the three-dimensional coordinates can be as follows:

$$\begin{cases} r = \sqrt{x_w'^2 + y_w'^2 + z_w'^2} \\ \theta = \arctan\left(\dfrac{\sqrt{x_w'^2 + y_w'^2}}{z_w'}\right) \\ \gamma = 2\cos\dfrac{y_w'}{x_w'} \end{cases} \qquad \text{Equation (15)}$$

Based on Equation (8), following relationship can exist:

$$\begin{cases} \varphi_{AD} = \varphi_{BC} \\ \theta_A = \theta_D \\ \theta_B = \theta_C \end{cases} \qquad \text{Equation (16)}$$

Further, according to Equation (7), $\beta_1$ and $\beta_2$ can be calculated by following relationships:

$$\begin{cases} \beta_1 = 2\arcsin\left(\sin\dfrac{\varphi_{AD}}{2}\big/\cos\alpha_1\right) = 2\arcsin\left(\sin\dfrac{\varphi_{AD}}{2}\big/\sin\theta_A\right) \\ \beta_2 = 2\arcsin\left(\sin\dfrac{\varphi_{BC}}{2}\big/\cos\alpha_2\right) = 2\arcsin\left(\sin\dfrac{\varphi_{BC}}{2}\big/\sin\theta_B\right) \end{cases} \qquad \text{Equation (17)}$$

Referring back to FIG. 18, in an alternative embodiment, when the sensor has a W:H ratio of 4:3, the horizontal $FOV_{hor}$ 179 is 84°, the vertical $FOV_{ver}$ 178 is 66°, and an upward pitch angle is 45°, $\beta_1$ and $\beta_2$ can be calculated as:

$$\begin{cases} \beta_1 = 150.1005° \\ \beta_2 = 74.0606° \end{cases} \qquad \text{Equation (18)}$$

Then, a theoretical number of images at the upward pitch angle of forty-five degrees can be calculated as:

$$M_i = \text{MAX}\left(\left\lceil\dfrac{360}{\tfrac{3}{4}\beta_1}\right\rceil, \left\lceil\dfrac{360}{\tfrac{3}{4}\beta_2}\right\rceil\right) = 7 \qquad \text{Equation (19)}$$

For purposes of ensuring a predetermined overlapping area of one-fourth of a height of any vertically adjacent images, a number of image rows for downward pitch angles can be calculated as:

$$N_2 = \left\lceil\dfrac{90}{\tfrac{3}{4}\theta_{ver}}\right\rceil \qquad \text{Equation (20)}$$

When the imaging device 580 is at a downward pitch angle, i.e., when the pitch angle is less than zero degrees, the number of images needed to cover an image row can be $M_{2i}$ ($i \in (1, N_2)$). Pursuant to a symmetry principle, an issue can be to ensure a predetermined overlapping area at a top of each image. The predetermined overlapping area can be one-fourth of a width of an upper portion of any two horizontally adjacent images. When the pitch angle of the imaging device 580 is at a pitch angle of $-\alpha$, the number of images needed to cover a full latitude circle (a full horizontal rotation) can be identical with the number of images when the imaging device 580 is at a pitch angle of $\alpha$.

Now referring back to FIG. 9, when the imaging device 580 is oriented at a first pitch angle (a pitch angle of zero degrees or in a horizontal direction), a predetermined number $M_0$ of images can be needed to cover a full horizontal rotation. For purposes of capturing the images, the imaging device 580 can capture images successively at yaw positions: 0 degrees, $360/M_0$ degrees, $2 \times 360/M_0$ degrees, $3 \times 360/M_0$ degrees, . . . $(M_0-1)*360/M_0$ degrees.

Now referring back to FIG. 8, for purposes of covering a full rotation at an upward pitch angle $\varphi/N_1$, additional images to the number of images at the first pitch position can be needed to ensure enough overlapping areas in the horizontal direction. In some embodiments, two images more than the number of images at the first pitch position can be needed, i.e., $M_0+2$ images can be needed at the pitch angle $-90/N_1$.

When $N_1>1$, a plurality of upward pitch angles can exist, e.g., pitch angles of $$\frac{2 \times \varphi}{N_1}, \ldots, \text{ and } \frac{(N_1-1) \times \varphi}{N_1}$$

degrees. Additional images to the image number at the first pitch position can also be needed to ensure enough overlapping areas in the horizontal direction.

For purposes of covering a full rotation at a downward pitch angle $-90/N_1$, additional images to the number of images at the first pitch position can be needed to ensure enough overlapping areas in the horizontal direction. In some embodiments, two images more than the number of images at the first pitch position can be needed, i.e., $M_0+2$ images can be needed at the pitch angle $-90/N_1$.

When $N_2>2$, a plurality of upward pitch angles can exist, e.g., pitch angles θ1

$$\frac{2 \times 90}{N_1}, \ldots, \text{ and } \frac{(N_1-2) \times 90}{N_1}$$

degrees. Additional images to the image number at the first pitch position can also be needed to ensure enough overlapping areas in the horizontal direction.

Although shown and described as being constantly spaced between two adjacent images for purposes of illustration only, the spacing between two adjacent images can be uniform and/or vary as long as abundant overlapping areas can be ensured between the adjacent images.

Alternatively and/or additionally, an anchor image can be needed to cover a bottom portion or a top portion of the panorama image. In case the anchor image covers the bottom portion, the imaging device 580 can capture the anchor image at a pitch angle of negative ninety degrees, i.e., pointing the imaging device 580 directly toward the ground.

Following table (1) illustrates a practical embodiment of the exemplary method 200. In table (1), four image rows and corresponding number of images in each row are listed.

TABLE (1)

| Total Number of Images | Pitch Angle | Number of Images for a Rotation | Horizontal Space Angle between images |
|---|---|---|---|
| 23 | 0° (Horizontal) | 6 Images | 60° |
| | 30° (Upward) | 8 Images | 45° |
| | −45° (Downward) | 8 Images | 45° |
| | −90° (Downward) | 1 Images | — |

As listed in table 1, the FOV of the imaging device 580 of FIG. 6 can be presumed as having a horizontal FOV angle $\theta_{hor}=84°$ and a vertical FOV angle $\theta_{ver}=66°$. A maximum upward pitch angle can be presumed as $\varphi=30°$.

According to the approaches shown and described herein, the four image rows can be determined at pitch angles: 0°, 30°, −45° and −90° respectively. Among the four pitch angles, 0° refers to a first pitch position of a horizontal direction, 30° refers to a pitch angle above the first pitch position (an upward pitch angle), and −45° and −90° refer to pitch angles below the first pitch position (downward pitch angles). For purposes of enhancing stitching effects of a result panorama image, more images than a theoretically deducted number of images can be applied to provide certain overlapping margins, As listed in table 1, $M_0$ can be six, i.e., six images can be used to cover a full latitude circle (the full horizontal rotation) at the first pitch position. The images can be captured with a constant angle space between any two adjacent images. The angle space can be sixty degrees, resulting in yaw positions at: 0 degrees, 60 degrees, 120 degrees, 180 degrees, 240 degrees and 300 degrees.

The number of images at the upward pitch angle of thirty degrees can be determined as eight. Similarly, the images can be evenly distributed along a full rotation at the upward pitch angle thirty degrees. The angle space between any adjacent images can be forty-five degrees, resulting in yaw positions at: 0 degrees, 45 degrees, 90 degrees, 135 degrees, 180 degrees, 225 degrees, 270 degrees and 315 degrees.

The number of images at the downward pitch angle of negative forty-five degrees can be eight. Similarly, the images can be evenly distributed along a full rotation at the upward pitch angle of negative forty-five degrees. The angle space between any adjacent images can be forty-five degrees, resulting in yaw positions at: 0 degrees, 45 degrees, 90 degrees, 135 degrees, 180 degrees, 225 degrees, 270 degrees and 315 degrees.

One anchor image can be provided at the downward pitch angle of negative ninety degrees, i.e., the imaging device 580 targeting directly to the ground. Although shown and described as negative ninety degrees for purposes of illustration only, the anchor image can be positioned in any other suitable positions, such as a top position of the panorama image.

Figure 20:
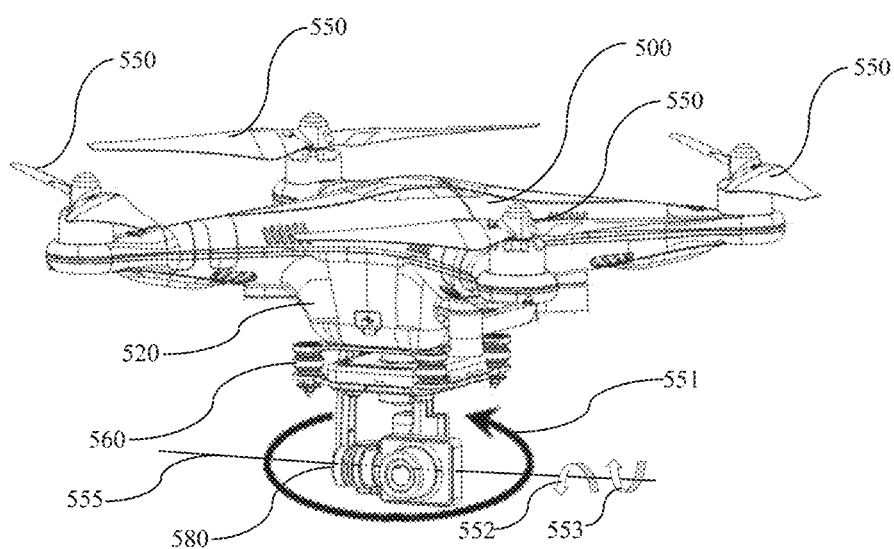
FIG. 20 is an exemplary schematic diagram illustrating an embodiment of an imaging device implementing the method of FIG. 1 or FIG. 6, wherein the imaging device is positioned on a mobile platform via a gimbal.

FIG. 20 illustrates an embodiment of an exemplary imaging system 300 for implementing the method 100 of FIG. 1. Turning to FIG. 20, an imaging device 580 is coupled to a gimbal 560 that is coupled with a mobile platform 500. The mobile platform 500 can be any conventional type of mobile platform, such as an Unmanned Aerial Vehicle ("UAV") that can have four propellers 550 for providing lifting power as shown in FIG. 20.

The mobile platform 500 can have a fuselage 520 that can house a controller (not shown) for executing the methods shown and described herein. The fuselage 520 can house one or more non-transitory computer readable storage media (not shown) that can be associated with the controller. The storage media can provide storage for instructions for implementing the methods shown and described herein to form a computer program production.

The gimbal 560 can be a three-dimensional gimbal that can enable the imaging device 580 to rotate in a horizontal plane, such as a rotation 551. The rotation of the gimbal 560 can orient the imaging device 580 to various yaw angles. Although shown as a rotation 551 in an anticlockwise direction for purposes of illustration only, the gimbal 560 can rotate in a clockwise direction to orient the imaging device 580 at any predetermined yaw angle.

Alternatively and/or additionally, the gimbal 560 can rotate about a horizontal axis 555 in at least one of two directions 552, 553. In some embodiments, the gimbal 560 can rotate about the horizontal axis 555 in both directions 552, 553 to provide the imaging device 580 with various pitch positions (or pitch angles). The gimbal 560 can make a full horizontal rotation at each of the pitch positions. When the imaging device 580 is oriented horizontally, the pitch position of the imaging device 580 can be referred as a first pitch position (or a pitch angle of zero degrees). When the imaging device 580 is oriented above the first pitch position, the pitch position of the imaging device 580 can be referred as at an upward pitch position (or a positive pitch angle). When the imaging device 580 is oriented below the first pitch position, the pitch position of the imaging device 580 can be referred as at a downward pitch position (or a negative pitch angle).

In some embodiments, the gimbal 560 can be a stabilizable gimbal to provide the imaging device 580 capacities to alleviate vibrations when capturing images. In some embodiments, an Inertial Measurement Unit ("IMU") (not shown) can be arranged inside or outside of the fuselage 520 for acquiring real-time attitude information. Alternatively and/or additionally, any other devices and/or equipment can be arranged inside or outside of the fuselage 520. For illustrative purposes, a gyroscope, an accelerometer, a Global Positioning System ("GPS") and/or a magnetometer (not shown) can be provided for acquiring the real-time attitude information.

Figure 21:
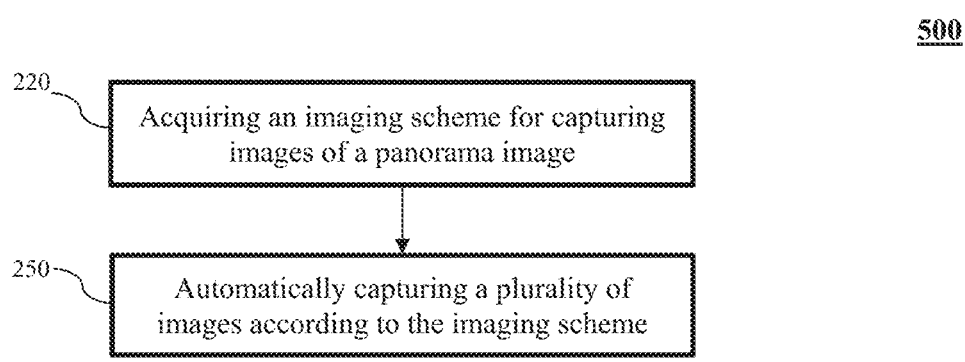
FIG. 21 is an exemplary top-level flow-chart illustrating an embodiment of method for capturing images of a panorama image, wherein an imaging scheme for capturing the images of a panorama image is acquired and automatically executed.

FIG. 21 illustrates an embodiment of an exemplary method 500 for automatically capturing images of a panorama image. Turning to FIG. 21, an imaging scheme for capturing the images of the panorama image is acquired and automatically executed. In FIG. 21, an imaging scheme designed for capture images of a panorama image can be acquired, at 220. The imaging scheme can include, for example, a number of images to form the panorama image, each image corresponding to a pitch angle and/or a yaw angle (or attitude status). The imaging scheme can further include an order for capturing the images.

The imaging scheme can advantageously include a plurality of images to form the panorama image. At 250, the plurality of images according to the imaging scheme can be captured automatically. Attitude status of an imaging device 580 (shown in FIG. 20) can be adjusted according to the imaging scheme for capturing the plurality of images one by one in a predetermined order defined by the imaging scheme. For purposes of adjusting the attitude status of the imaging device 580, a gimbal 560 coupled with the imaging device 580 and a mobile platform 500 coupled with the imaging device 580 and/or the gimbal 560 can be coordinated to provide the attitude status of the imaging device 580.

Although shown and described as capturing the plurality of images in the predetermined order defined by the imaging scheme for purposes of illustration only, the imaging scheme can be reordered to fit a requirement of the imaging device 580.

Figure 22:
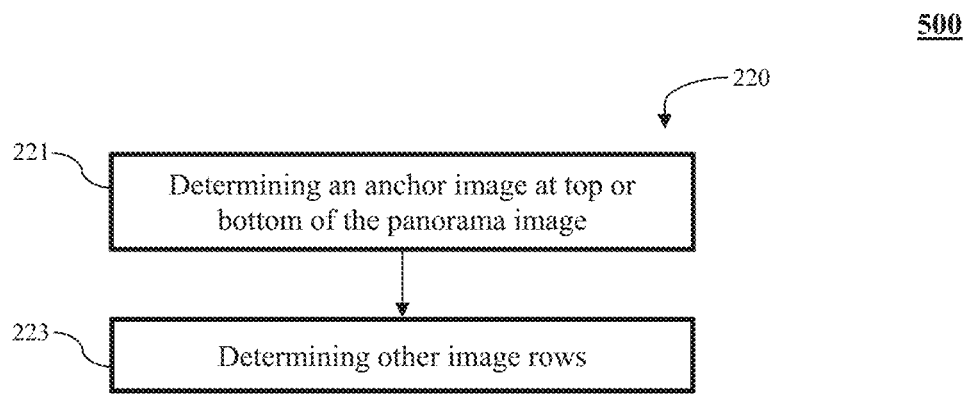
FIG. 22 is an exemplary flow-chart diagram illustrating an alternative embodiment of the method of FIG. 21, wherein the imaging parameters include parameters of an imaging device and parameters of a gimbal and/or a mobile platform.

FIG. 22 illustrates an alternative embodiment of the exemplary method 500. Turning to FIG. 22, the imaging scheme of FIG. 1 is acquired by determining an anchor image and other image rows. In FIG. 22, the anchor image can be either positioned at a top of a panorama image or at a bottom of the panorama image, at 221. The imaging scheme can define position of the anchor image or the position can be decided when the imaging scheme is executed.

One or more other image rows of the imaging scheme can be determined, at 223. The other image rows can include, for example, an image row along a pitch horizontal direction, one or more image rows above the pitch horizontal direction, and/or one or more image rows below the pitch horizontal direction. The imaging scheme can be acquired to determine a number of rows and their corresponding pitch angles, as well as number of images in each row and their corresponding yaw angles.

Figure 23:
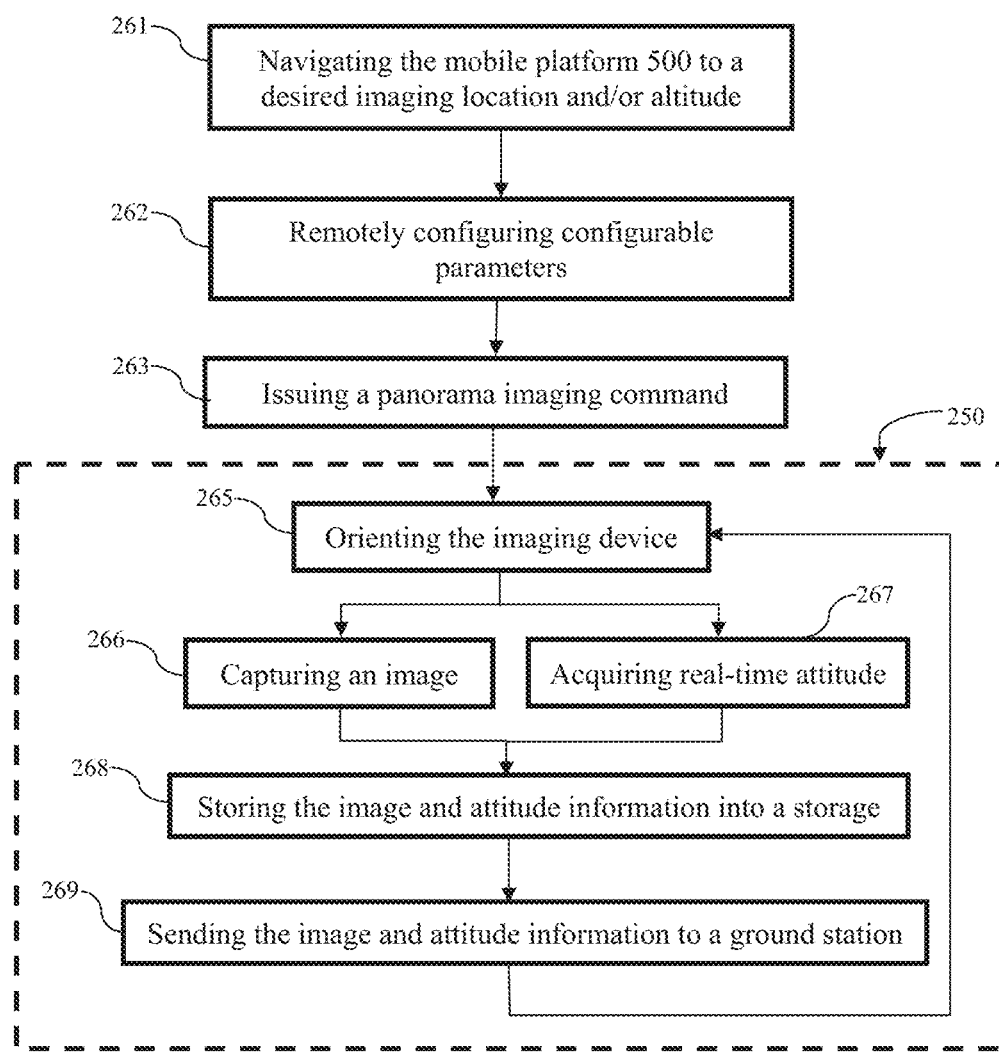
FIG. 23 is an exemplary detail flow-chart diagram illustrating an alternative embodiment of the method of FIG. 21, wherein a mobile platform is navigated and the images are captured automatically according to the imaging scheme.

FIG. 23 illustrates an alternative embodiment of the exemplary method 500. Turning to FIG. 23, the mobile platform 500 is navigated, and the plurality of images are captured automatically according to the imaging scheme. In FIG. 23, a mobile platform 500 that is coupled with an imaging device 580 can be navigated to a desired imaging location and/or a desired altitude, at 261. In some embodiments, the desired imaging location and/or the desired altitude can be defined with the imaging scheme and the mobile platform 500 can automatically navigate to the desired imaging location and/or the desired altitude. In some other embodiments, the mobile platform 500 can be navigated manually to the desired imaging location and/or the desired altitude.

At 262, the imaging device 580 can be configured to set certain configurable parameters in order to facilitate capturing the images. The configurable parameters can be set based on ambient conditions, including, but not limited to, territorial features, light, a direction of the light, time, color and/or an operator's desired effect. The configurable parameters can include, but are not limited to, an output format and/or an exposure setting, such as an aperture, a shutter speed and the like. The configurable parameters can be configured automatically or manually from a remote location. Alternatively or additionally, the steps 261, 262 can be performed in any order, any combination, individually, and/or optionally.

At 263, a command for panorama imaging can be issued. The command can be issued to certain control mechanism (not shown) that can control the mobile platform 500, the gimbal 560 and/or the imaging device 580. In some embodiments, the panorama imaging command can be issued remotely to initiate a panorama imaging process. In some other embodiments, the command can be issued automatically by the control mechanism when the configurable parameters are set and the mobile platform 500 navigates to the desired position and the desired altitude.

The imaging device 580 can start automatically capturing the plurality of images according to the imaging scheme, at 250. The imaging device 580 can be oriented to an attitude of an image according to the imaging scheme, at 265. The image can be, for example, the anchor image or any other image. The imaging device 580 can be pointed to the desired attitude by changing a pitch angle and/or a yaw angle. The pitch angle and/or the yaw angle of the imaging device 580 can be changed by operating the gimbal 560 and/or the mobile platform 500.

When oriented to the desired attitude, the imaging device 580 can automatically capture the image, at 266, in any suitable format. While the imaging device 580 is capturing the image, real-time attitude information can also be acquired, at 267. In some embodiments, the real-time attitude information can be captured via an IMU). In other embodiments, the real-time attitude information can be captured via any other suitable devices individually or in any combination, including, but not limited to, a gyroscope, an accelerometer, a GPS and/or a magnetometer. Although shown and described as capturing the real-time attitude information while capturing the image for purpose of illustration only, the real-time attitude information can be captured before or after capturing the image.

The captured image and the acquired attitude information can be stored into a storage (not shown). The storage can be any type of suitable storage device, including, but not limited to, a secure digital card ("SD"), an embedded multimedia card ("eMMC"), a solid state drive ("SSD"), a USB disk, or any other type of mobile disk, and the like. The storage can be attached to the imaging device 580 or be communicatively associated with the imaging device 580. The storage can save the captured images and/or the acquired attitude information until the captured images and/or the acquired attitude information are transferred for further processes, such as a stitching process.

Optionally, the captured image and corresponding attitude information can be sent or transferred, at 269, to a ground station (not shown) from the storage. The ground station can be a device that has a capacity of processing the images, such as stitching the images to form the panorama image. The image and the corresponding attitude information can be transferred to the ground station via any communication connections, including, but not limited to, a wired connection, a wireless connection and/or a network connection. The transfer can be conducted in accordance with any suitable transmission protocols.

Although shown and described as sending the captured image and the attitude information right after the storing for purposes of illustration only, the image and the attitude information can be sent in any predetermined order. In some embodiments, the captured image and the attitude information can be sent with assistance of the imaging device 580 when the imaging device 580 is not capturing images. Therefore, the captured image can be sent to the ground station at any time and, in some embodiments, are sent to the ground station in an order that the images are captured.

When the captured image and the attitude information are stored into the storage, whether or not they are sent to the ground station, the imaging device 580 can be oriented to the attitude information of one of the rest images according to the imaging scheme, at 265. Another image can be captured, at 266, and corresponding attitude information can be acquired, at 267. The captured image and attitude information can be stored into the storage, at 268, for sending to the ground station, at 269. This process can continue until all images defined in the imaging scheme are captured.

The capturing process, at 250, can involve in other optional steps. Such steps can include, but are not limited to, adjusting the configuration of the imaging device 580 and/or resolution reducing.

Figure 24:
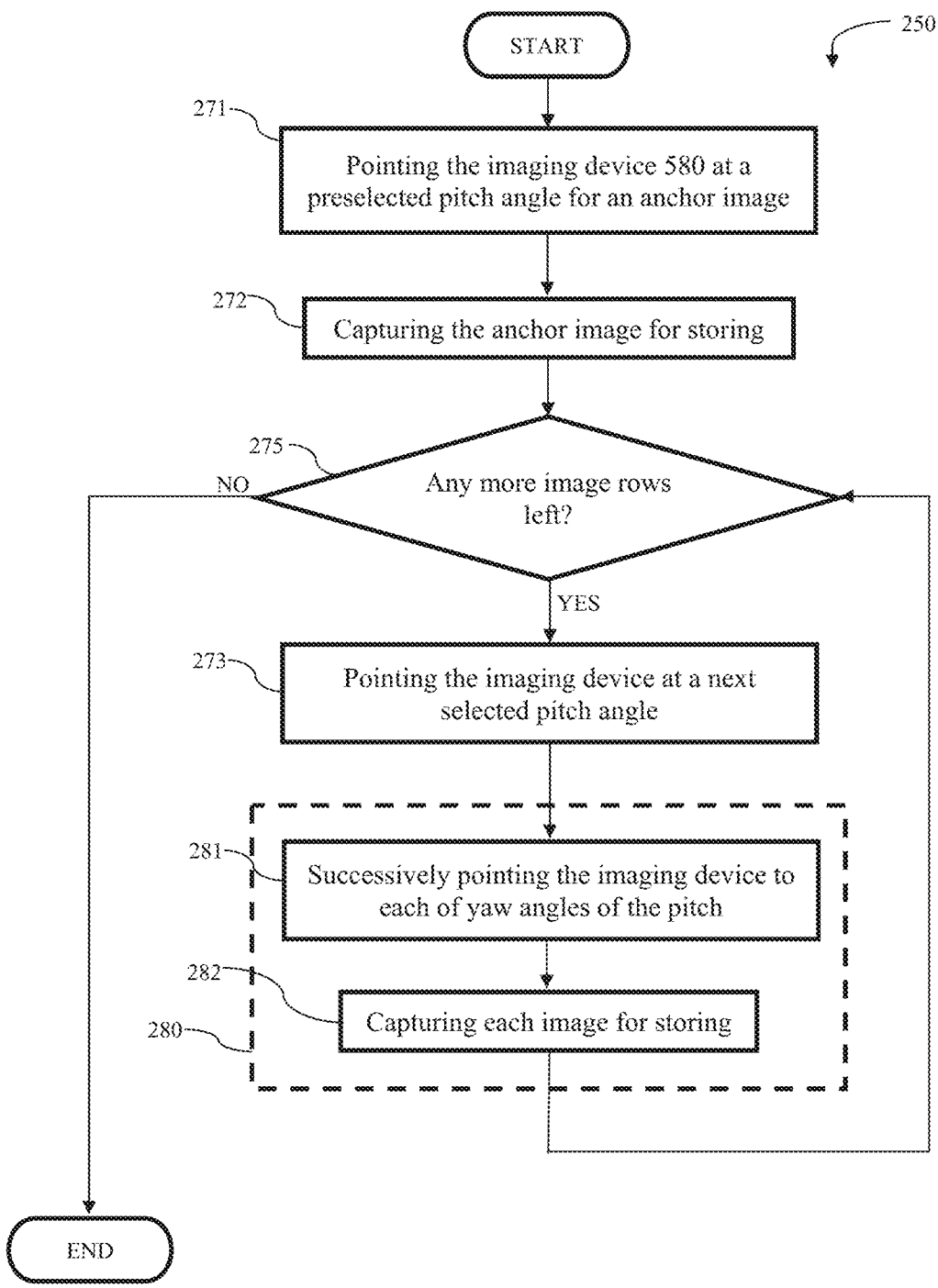
FIG. 24 is an exemplary detail flow-chart diagram illustrating an alternative embodiment of the method of FIG. 21, wherein the automatic image capturing process according to the imaging scheme.

FIG. 24 illustrates an alternative embodiment of the exemplary method 500. Turning to FIG. 24, the automatic image capturing process according to the imaging scheme via a flow-chart diagram. In FIG. 24, an imaging device 580 can be pointed at a preselected pitch angle for an anchor image according to the imaging scheme, at 271. The preselected pitch angle for the anchor image can be either at the top or at the bottom of a panorama image. The imaging device 580 can be pointed to the selected pitch angle via operating a gimbal 560 (shown in FIG. 20) coupled with the imaging device 580.

As shown in FIG. 24, the anchor image can be captured, at 272. The image can be captured in a suitable conventional manner. The captured image can be stored into a storage (not shown) for a purpose of transferring to a location for stitching.

When the anchor image is captured, the imaging scheme can be checked to determine whether there is any more image row left for processing, at 275. When there is at least one image row available, the imaging device 580 can be moved to another selected image row by pointing to a pitch angle corresponding to the selected image row, at 273.

The imaging device 580 can be pointed to the selected pitch angle, at 273, for example, a pitch horizontal direction. Images of an image row at the preselected pitch angle can be acquired, at 280. For purposes of capturing images of the image row, the imaging device 580 can be pointed to each of yaw angles defined for the preselected pitch angle in the horizontal direction, at 281. The imaging device 580 can capture an image at each of the yaw angles, at 282. When each of the images is captured, the image can be stored in the storage and/or transferred to the location for stitching.

Similarly, when the images of the preselected pitch angle are captured, the imaging scheme can be checked to determine whether there is any more image row left for processing (i.e. whether each image row is completed), at 275. When there is at least one image row available, the imaging device 580 can be moved to another selected image row. Images of the image row at the selected pitch angle can be captured, at 280. The imaging device 580 can be successively pointed to each of yaw angles defined for the selected pitch angle in the horizontal direction, at 281 and capture an image at each of the yaw angles, at 282. When each of the images is captured, the image can be stored in the storage and/or transferred to the location for stitching. The steps 275, 273, 281 and 282 can be performed repeatedly until the images defined in the imaging scheme are captured.

Although shown and described as capturing the image at each of the yaw angles for purposes of illustration only, the real-time attitude information can be acquired while, before or after capturing the image in a similar manner shown and described with reference to FIG. 23. The real-time attitude information can be stored into the storage corresponding to each of the captured images. When each of the images are stored into the storage, the image can be transferred to a ground station for further processing at any time and/or in any suitable manner.

Figure 25:
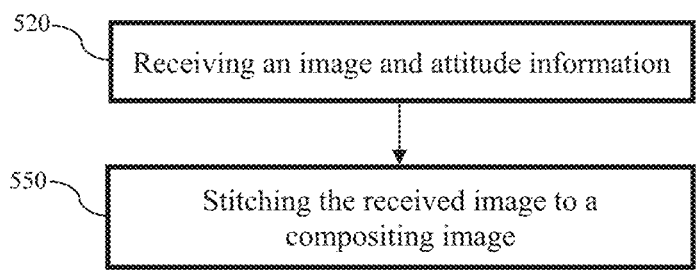
FIG. 25 is an exemplary top-level flow-chart illustrating an embodiment of method for stitching images to form a panorama image, wherein an image and corresponding attitude information are received and stitched to a compositing image.

FIG. 25 illustrates an embodiment of an exemplary method 600 for stitching images to form a panorama image. Turning to FIG. 25, an image and corresponding attitude information are received and stitched to a compositing image. In FIG. 25, the image can be received, at 520, with the corresponding attitude information for that image. The image can be an image of a scene captured to form the panorama image. The attitude information can comprise real-time attitude information acquired while, before or after capturing the image. The attitude information can indicate where the image should be positioned in the panorama image.

At 550, the received image can be stitched onto the compositing image. The compositing image can be a panorama image of the scene. The compositing image can be the panorama image being built. In some embodiments, the compositing image can begin with, for example, an anchor image to incrementally construct the panorama image.

The stitching process can be executed based on the corresponding attitude information for each of the received images. The stitching process can be implemented automatically in an incremental manner. The attitude information can provide a base for aligning the received image and for limiting a micro-tuning scope, so that, a calculation volume can be decreased.

Figure 26:
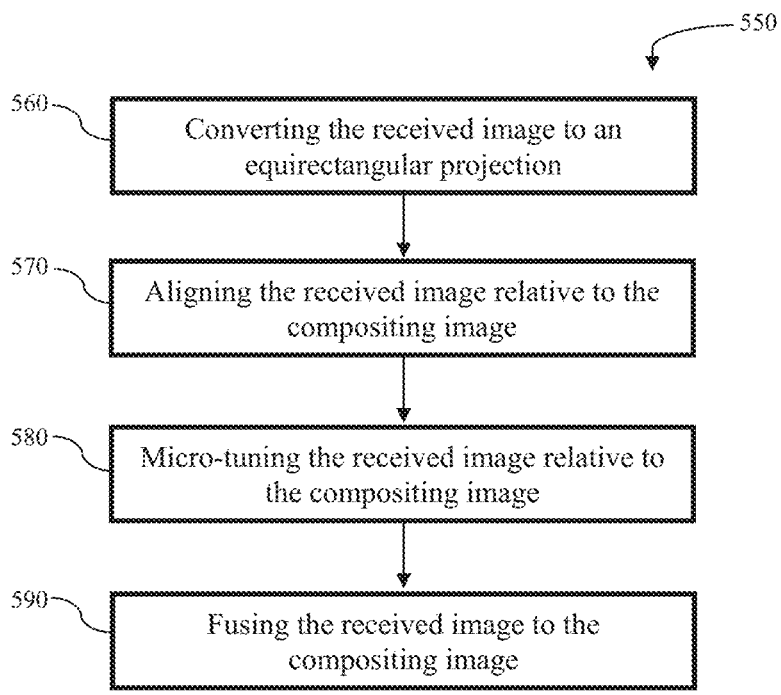
FIG. 26 is an exemplary flow-chart diagram illustrating an alternative embodiment of the method of FIG. 25, wherein the received image can be stitched to the compositing image by converting, aligning, micro-tuning and fusing the received image.

FIG. 26 illustrates an alternative embodiment of the exemplary method 600. Turning to FIG. 26, the received image can be stitched to the compositing image by converting, aligning, micro-tuning and fusing the received image. In FIG. 26, the received image can be converted into an equirectangular projection, at 560. The equirectangular projection (or equidistant cylindrical projection or geographic projection) can be a projection that maps meridians to vertical straight lines of constant spacing and circles of latitude to horizontal straight lines of constant spacing. The received image can be converted into the equirectangular projection via any suitable conventional manner.

The received image can be aligned, at 570, relative to the compositing image based on attitude information that can be received with the image. The attitude information can reflect a position where the received image should be positioned relative to the composting image.

The position based on the attitude information can lack a required accuracy because, for example, the attitude information can have deviations exist with measurement devices used to acquire the attitude information. In some embodiments, the received image can be micro-tuned relative to the compositing image, at 580, to acquire a satisfactory match. The micro-tuning can depend on available parameters of measurement deviations of the attitude information, such as a pitch deviation, a yaw deviation and/or a roll deviation. The received image can be micro-tuned by matching a portion of the received image and a portion of the compositing image. Such matching can be acquired by matching common feature points on both the received image and the compositing image. Because received image can be positioned approximately based on the attitude information, a scope of the matching can be limited to, for example, the deviations.

When the relative position is ascertained, the received image can be fused to the compositing image, at 590, to further the panorama image. The received image can be fused to the compositing image via any conventional approaches that can result in a smooth blended result. In some embodiments, the received image can be fused to the compositing image with a blending algorithm to reduce artifacts at the overlapping areas. Such blending algorithm can include, e.g., a Laplacian Pyramid Blending algorithm.

Other suitable blending algorithms can be applied in fusing the received image to the compositing image, including, but not limited to, any pyramid blending, feathering or center weighing image blending algorithm and the like.

Because the received image can be stitched to the compositing image when the received image is aligned and micro-tuned, the panorama image can be constructed or stitched in an incremental manner. However, although shown and described as stitching the received image incrementally, the images can be globally optimized after at least a portion of images are received and micro-tuned. The global optimization can be performed in a limited scope to finalize the panorama image with another layer of fine-tuning.

Figure 27:
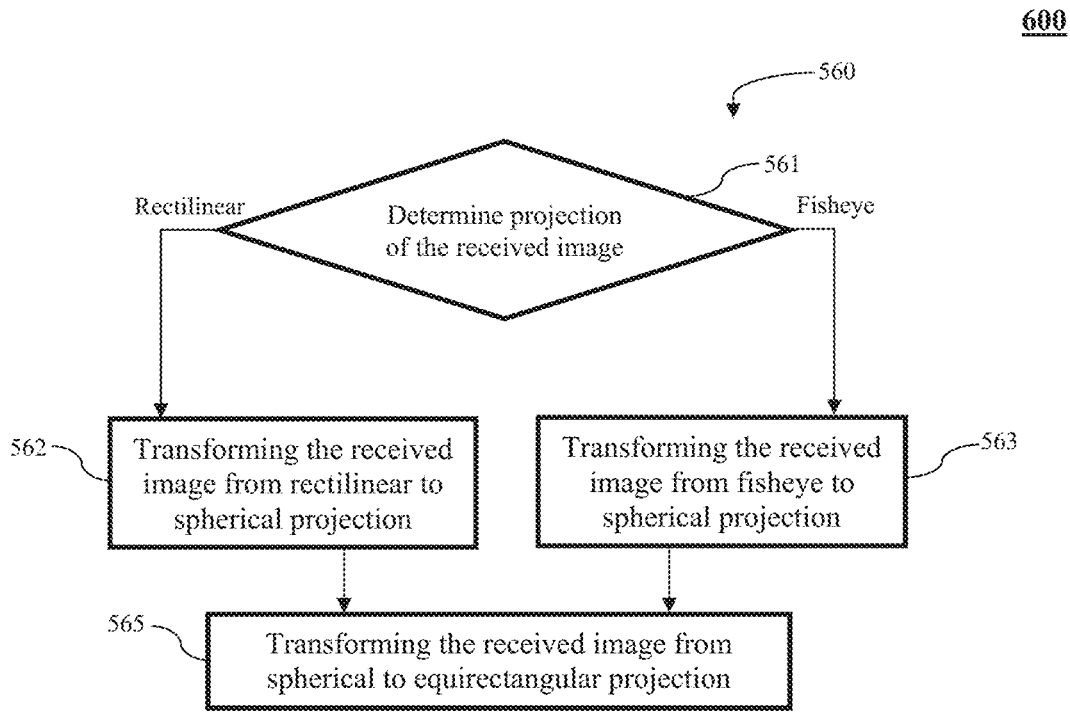
FIG. 27 is an exemplary flow-chart diagram illustrating another alternative embodiment of the method of FIG. 25, wherein the received image is converted to an equirectangular projection via two transformations.

FIG. 27 illustrates another embodiment of the exemplary method 600. Turning to FIG. 27, the received image is converted to an equirectangular projection via two transformations. In FIG. 27, a projection of the received image can be determined, at 561. In some embodiments, the received image can be acquired via a rectilinear lens. In such case, the received image can comprise a rectilinear projection. In some other embodiments, the received image can be acquired with a fisheye lens, for example, a circular fisheye lens. In such case, the received image can comprise a fisheye projection. A type of lens used to acquire the received lens can be determined by configuration for stitching or by a parameter transferred with the image.

When determined as acquired by a rectilinear lens, the received image can be transformed to a spherical projection from the rectilinear projection, at 562. The spherical projection can be a projection that projects a sphere onto a plane, including, but not limited to, orthographic projection, gnomonic projection, stereographic projection and equal area projection. The transformation from the rectilinear projection to the spherical projection can be performed in any conventional manner. The spherical radius of the spherical projection can be equal to a focal length of the rectilinear lens used to capture the received image.

When determined as acquired by a fisheye lens, the received image can be transformed to the spherical projection from the fisheye projection, at 563. The transformation from the fisheye projection to the spherical projection can be performed in any conventional manner. The spherical radius of the spherical projection can be equal to a focal length of the fisheye lens used to capture the received image.

The received image in the spherical projection can be transformed from the spherical projection to the equirectangular projection, at 565. The transformation from the spherical projection to the equirectangular projection can be performed in any suitable conventional manners.

Although shown and described as the received image being captured using a rectilinear lens or a fisheye lens for purposes of illustration only, the received image can be captured using other suitable types of lenses. Although shown and described as transforming to the equirectangular projection through a spherical projection for purposes of illustration only, the received image can be transformed to the equirectangular projection in a direct manner or through any other suitable projections.

Figure 28:
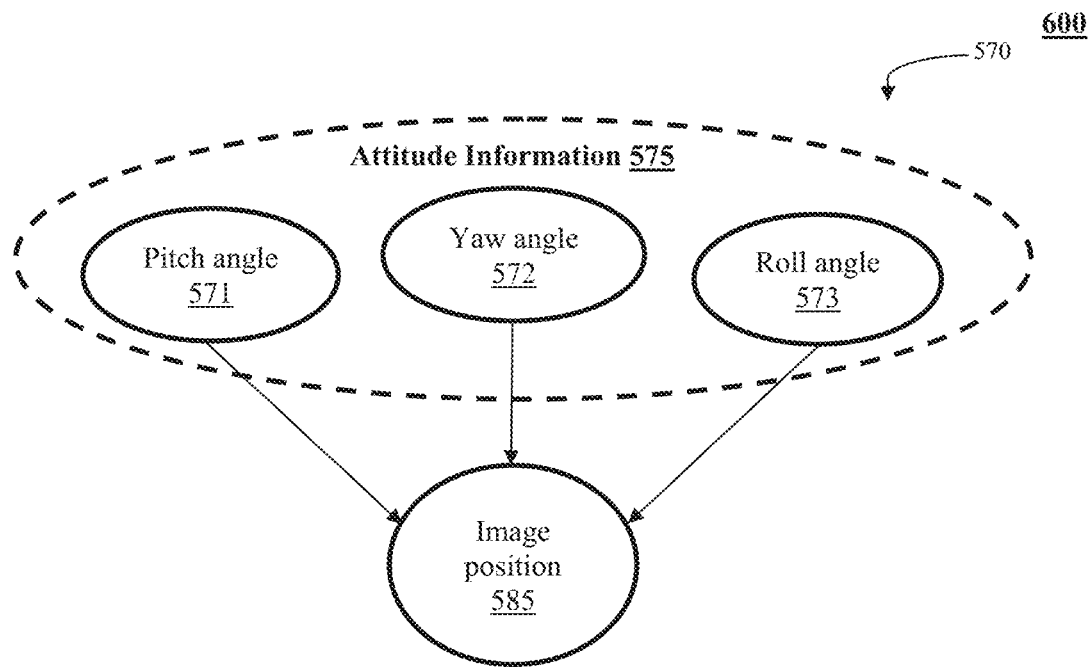
FIG. 28 is an exemplary flow-chart diagram illustrating another alternative embodiment of the method of FIG. 25, wherein the received image is aligned relative to the compositing image based on the attitude information.

FIG. 28 illustrates another embodiment of the exemplary method 600. Turning to FIG. 28, the received image is aligned relative to the compositing image based on the attitude information 575 of FIG. 25. In FIG. 28, the attitude information 575 can include a pitch angle 571, a yaw angle 572 and/or a roll angle 573. Since the attitude information 575 can reflect attitude status of an imaging device 580 (shown in FIG. 20) used to capture the received image, the pitch angle 571, the yaw angle and/or the roll angle 573 can be used to decide an image position 585 of the received image.

The image position 585 of the receive image can be a position relative to the compositing image. In some embodiments, the compositing image can be built on a compositing plane. Each of the images forming the compositing image can have corresponding attitude information, including the pitch angle, the yaw angle, and/or the roll angle. The received image can, therefore, be aligned with the images forming the compositing image based on the attitude information.

Although shown and described as including pitch the angle 571, the yaw angle 572 and roll angle 573 for purposes of illustration only, the attitude information can include other information, such as lens type and altitude of the imaging device 580 etc.

Figure 29:
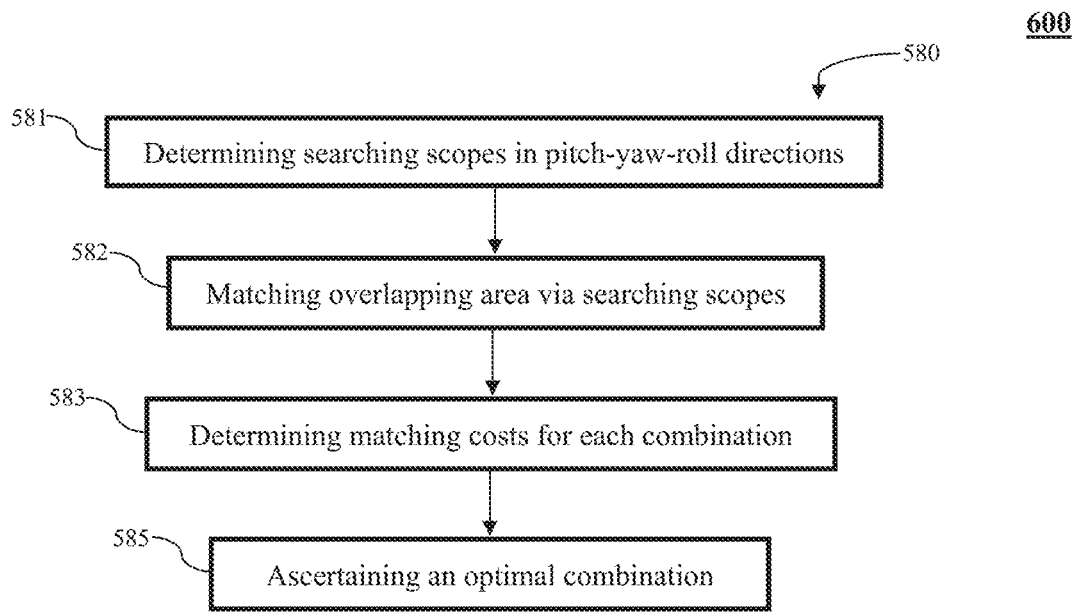
FIG. 29 is an exemplary flow-chart diagram illustrating another alternative embodiment of the method of FIG. 25, wherein the received image can be micro-tuned by determining searching scopes, matching overlapping area, matching costs and ascertaining an optimal combination.

FIG. 29 illustrates an alternative embodiment of the exemplary method 600. Turning to FIG. 29, the received image can be micro-tuned by determining searching scopes, matching overlapping area, matching costs and ascertaining an optimal combination. In FIG. 29, the searching scopes can be determined in a pitch direction, a yaw direction and/or a roll direction, at 581. Each of the searching scopes can be determined based on deviations in each of the three directions.

At 582, as least one overlapping area between the received image and the compositing image can be matched via the determined searching scopes. The overlapping area can refer to a common area on both the received image and the compositing image when the received image is positioned. For one received image, it can be possible that there is no overlapping area between the received image and the compositing image, such as, for an anchor image or a first image that is not the anchor image. When there exists no overlapping area, no micro-tuning is needed. However, when the received image overlaps the compositing image, one or more overlapping areas can exist in a horizontal direction and/or a vertical direction. In such case, at least one overlapping area can be micro-tuned for accurate position of the received image.

Micro-tuning of the overlapping area can be used to find matched pixels of the overlapping area. Because the received image can be positioned based on the attitude information, the micro-tuning can be limited to the searching scopes, which can substantively reduce calculation amount.

The received image and the compositing image can be found match by calculated matching costs for each combination of the searching scope. A matching cost can refer to an accumulation of pixel value differences for a certain combination of the pitch angle, the yaw angle and the roll angle. Matching costs for each of the combination can be determined, at 583.

At 585, an optimal combination of the pitch angle, the yaw angle and the roll angle can be ascertained. The optimal combination can be ascertained by comparing the matching costs for each of the combinations. In some embodiments, the optimal combination can be a combination with minimum matching cost. In other embodiments, the optimal combination can be selected when the matching cost is less than a predetermined threshold cost value.

Although shown and described as using the matching cost to determine the optimal combination for purposes of illustration only, other calculated values can be used to determine the optimal combination.

Figure 30:
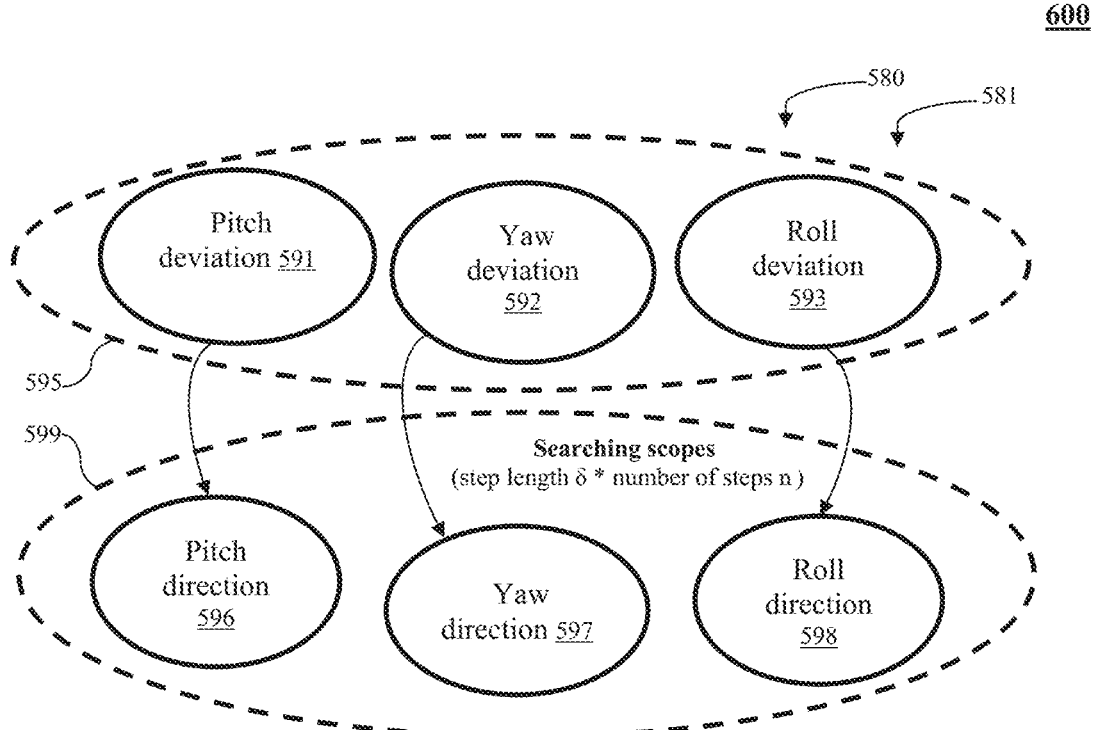
FIG. 30 is an exemplary flow-chart diagram illustrating an alternative embodiment of the method of FIG. 29, wherein searching scopes are determined based on deviations respectively.

FIG. 30 illustrates an alternative embodiment of the exemplary method 600. Turning to FIG. 30, the searching scopes 599 are determined based on the deviations 595 respectively. In FIG. 30, the deviations 595 can include a pitch deviation 591, a yaw deviation 592 and/or a roll deviation 593. The deviations 595 can be caused by various factors of an imaging device 580, a gimbal 560 coupled with the imaging device 580 and/or the mobile platform 500 coupled with the imaging device 580 and/or the gimbal 560 (collectively shown in FIG. 20).

As an example, the pitch deviation 591 can be a deviation in a pitch direction of the imaging device 580. The various factors that cause the pitch deviation 591 can include, but are not limited to, a control error, a delay error and a vibration amplitude in the pitch direction. The pitch deviation 591 can be a known factor for a combination of the imaging device 580, the gimbal 560 and the mobile device 500.

The yaw deviation 592 can be a deviation in a yaw direction the imaging device 580. The various factors that cause the yaw deviation 592 can include, but are not limited to, a control errors, a delay errors and a vibration amplitude in the yaw direction. The yaw deviation 591 can be a known factor for the combination of the imaging device 580, the gimbal 560 and the mobile device 500. Similarly, the roll deviation 592 can be a deviation in a roll direction the imaging device 580. The various factors that cause the roll deviation 592 can include, but are not limited to, a control errors, a delay errors and a vibration amplitude in the roll direction. The roll deviation 591 can be a known factor for the combination of the imaging device 580, the gimbal 560 and the mobile device 500.

The searching scopes 599 can be decided based on the deviations 595. For example, a searching scope 596 in a pitch direction can be decided based on the pitch deviation 591. Similarly, a searching scope 597 in a yaw direction can be decided based on the yaw deviation 592 and a searching scope 598 in a roll direction can be decide based on the roll deviation 593.

Each of the searching scope 599 can include a step length $\delta$ and a number of steps n. As shown in FIG. 30, a pitch deviation 591, a yaw deviation 592 and/or a roll deviation 593 can exist in attitude information when a received image is captured. In some embodiments, for a purpose of simplifying a determination process, the step length $\delta$ can be decided as a common step length. For purposes of illustration only, the number of steps can be n for the pitch direction, the yaw direction and the roll direction. Supposing a received image has a pitch angle $\alpha_i$, a yaw angle $\beta_i$, and a roll angle $\gamma_i$, the searching scopes can be: $\alpha_i \pm n\delta$ for the pitch direction; $\beta_i \pm n\delta$ for the yaw direction; and $\gamma_i \pm n\delta$. Then, there can be a total of $(2n+1)^3$ searching combinations.

Figure 31:
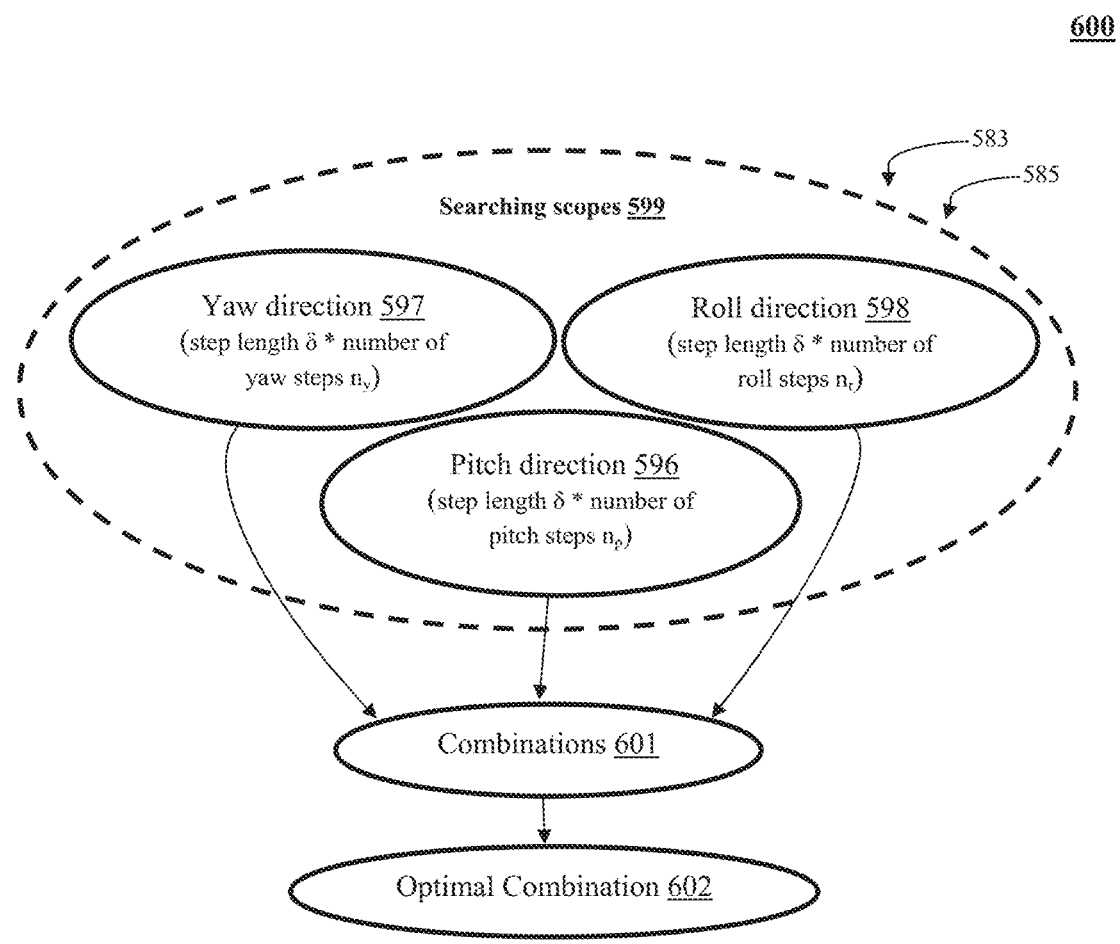
FIG. 31 is an exemplary flow-chart diagram illustrating an alternative embodiment of the method of FIG. 30, wherein the searching scopes are different.

In some embodiments, the pitch deviation 591, the yaw deviation 592 and/or the roll deviation 593 can be different, which can result in different searching scopes 599. FIG. 31 illustrates an alternative embodiment of the exemplary method 600, wherein the searching scopes 599 of FIG. 30 are different. In FIG. 31, the searching scope 596 in pitch direction, the searching scope 597 in yaw direction and the searching scope 598 in roll direction can be different.

Supposing the step length can be decided as S. To reflect the differences among the deviations 591, 592 and 593, the number of steps can be different among the three directions. Supposing $n_p$, $n_y$, and $n_r$ be the numbers of steps for the pitch direction, the yaw direction and the roll direction respectively, for the received image, the searching scopes can be: $\varphi_i \pm n_p \delta$ for the pitch direction; $\beta_i \pm n_y \delta$ for the yaw direction; and $\gamma_i \pm n_r \delta$. A total of $(2n_p+1)(2n_y+1)(2n_r+1)$ searching combinations 601 can be determined.

Although shown and described as being the common $\delta$ as the step length $\delta$ for determining the searching scopes for purposes of illustration only, different step length can be applied in determining the searching scopes in the pitch, yaw and roll directions respectively.

In some embodiments, a matching cost for each combination 601 of the searching step and the number of steps in each of the pitch direction, the yaw direction and the roll direction can be determined. The matching cost can be calculated via a Sum of Absolute Differences ("SAD") measure or a Normalized Cross-Correlation ("NCC") measure.

In FIG. 31, an optimal combination 602 can be determined based on the matching costs of each of the combinations 601. The optimal combination 602 can be ascertained by comparing the matching costs for each of the combinations 601. In some embodiments, the optimal combination 602 can be a combination with minimum matching cost. In other embodiments, the optimal combination 602 can be selected when the matching cost is less than a predetermined threshold cost value.

Although shown and described as using the matching cost to determine the optimal combination for purposes of illustration only, other calculated values can be used to determine the optimal combination.

Figure 32:
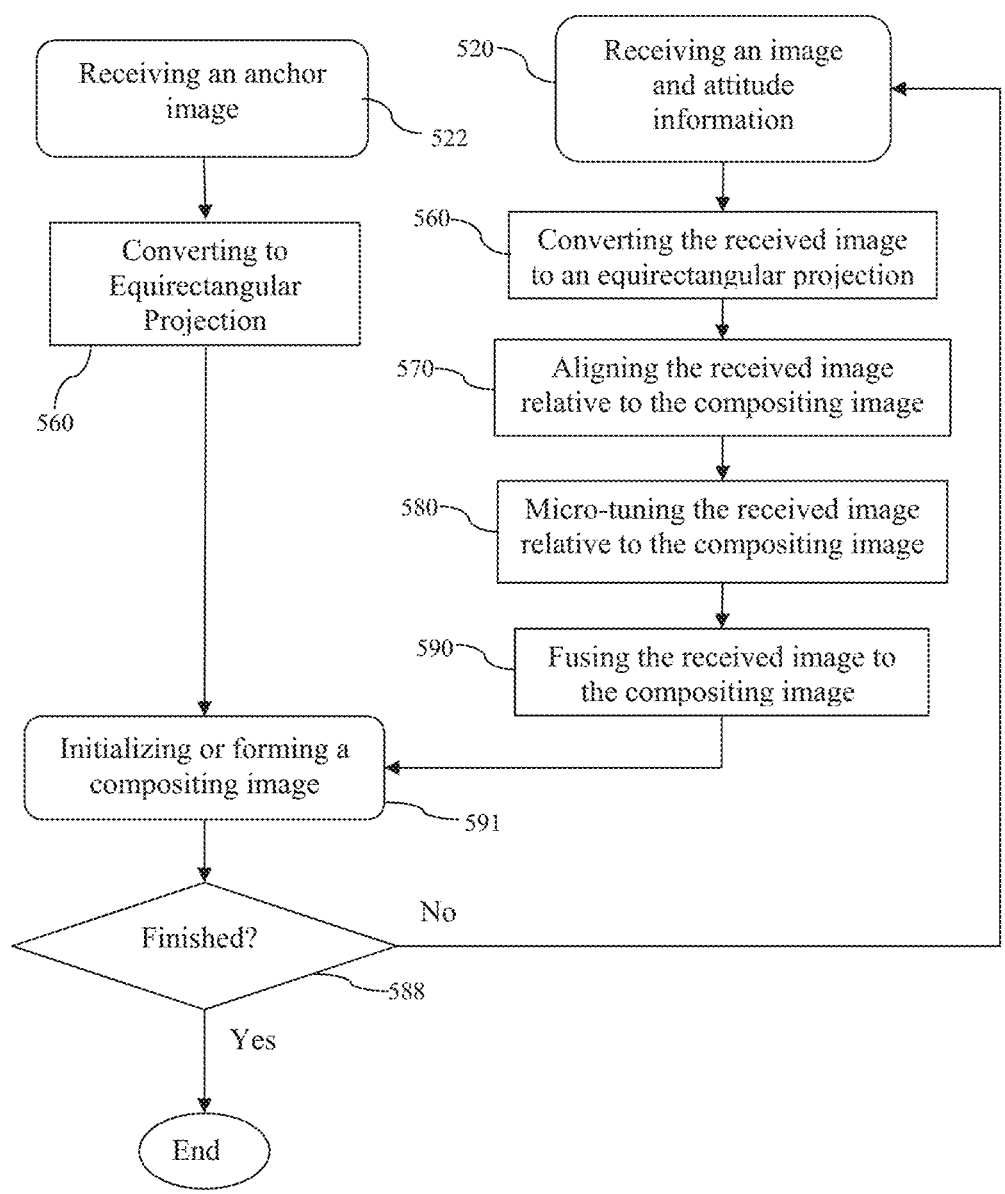
FIG. 32 is a detail exemplary flow-chart diagram illustrating an alternative embodiment of the method of FIG. 25, wherein an anchor image is initialized and other images are stitched to form a panorama image.

FIG. 32 illustrates an alternative embodiment of an exemplary method 600. Turning to FIG. 32, an anchor image is initialized and other images are stitched to form a panorama image. In FIG. 32, the anchor image can be received, at 522. The anchor image can be received with attitude information (not shown) or without the attitude information. When received without the attitude information, the anchor image can be positioned at a default position, such as, a bottom of the panorama image.

The anchor image can be converted to an equirectangular projection, at 560. The anchor image can be converted to the equirectangular projection in a manner shown and described herein. The anchor image in the equirectangular projection can be initialized at a proper position of a compositing image, at 591, based on either the received attitude information or the default position. Since the anchor image is a first image received, there can be no need of stitching or merging for the anchor image. In some embodiments, the anchor image can be a starting image of the compositing image.

Whether the stitching process is finished can be checked, at 588. Because now only the anchor image is positioned, there can be more images for stitching. At 520, another image can be received with corresponding the attitude information. In some embodiments, any image except for the anchor image can have the attitude information that can identify where the image should be aligned relative to the compositing image. The attitude information can include a pitch angle, a yaw angle and/or a roll angle.

The received image can be converted to an equirectangular projection, at 560, in a manner shown and described herein. Successively, the received image can be aligned relative to the compositing image, at 570. The received image can be aligned based on the corresponding attitude information of the received image.

Because, among other reasons, deviations can exist in the attitude information, the alignment based on the attitude information can be not satisfactorily precise. For a purpose of addressing the alignment precision, the received image can be micro-tuned relative to the compositing image, at 580. The micro-tuning can be performed by matching feature points in at least one overlapping between the received image and the compositing image. In some embodiments, each existing overlapping areas between the received image and the compositing image, either in a horizontal direction or in a vertical direction, can be micro-tuned to ensure the position precision of the receive image.

A result of the micro-tuning can be an optimal combination of a pitch-yaw-roll angle combination within certain searching scopes, for example, a minimum matching cost of the combination. When the optimal combination is acquired, the received image can be merged with the compositing image, at 590, by any suitable blending algorithm. The merged result can reduce any artifacts at the overlapping areas.

At 591, the received image can form the compositing image. In other words, the received image can further the compositing image by merging to the compositing image. Each merge of the received image can make the compositing image a step closer to the panorama image. Because the received image can be stitched to the compositing image one by one, the received image can be called incrementally stitched to form the panorama image. The incremental stitching approach can be more advantageous than other approaches, such as a global optimization approach, because the incremental stitching approach can dramatically reduce a calculation volume.

At 588, whether the stitching process is finished can be checked again. If no, another image can be received, at 520, and be processed and merged to the compositing image, at 590. If yes, the stitching process is finished and the compositing image can become the panorama image.

Although shown and described as using the incremental stitching approach for purposes of illustration only, the incrementally stitched panorama image can be partially or entirely be optimized. In such a case, the optimization can be limited because the images can have been positioned precisely. This optimization can further optimize the positions of the images within the panorama image from a global view.

Figure 33:
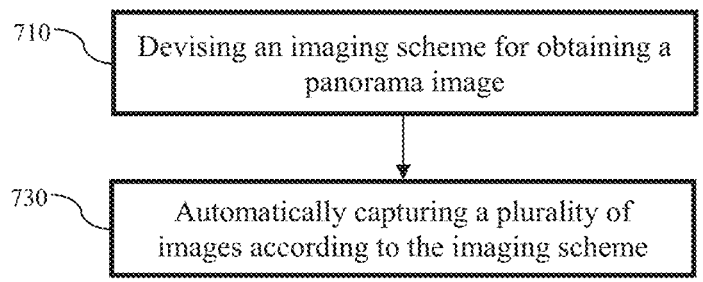
FIG. 33 is an exemplary top-level flow-chart illustrating an embodiment of a method for obtaining a panorama image, wherein a plurality of images can be captured according to an imaging scheme that is devised for obtaining the panorama image.

FIG. 33 illustrates an embodiment of an exemplary method 700 for obtaining a panorama image. Turning to FIG. 33, a plurality of images can be captured according to an imaging scheme that is devised for obtaining the panorama image. In FIG. 33, the imaging scheme for obtaining the panorama image can be devised, at 710. The panorama image can be a spherical panorama image. The imaging scheme can define the plurality of images that can form the panorama image.

The imaging scheme can be devised based on at least one imaging parameter. The imaging parameter can include at least one parameter of an imaging device 580, a gimbal 560 for coupling with the imaging device 580 or a mobile platform 500 associated with the imaging device 580 (collectively shown in FIG. 20). The imaging device 580 can be used for capturing the plurality of images defined in the imaging scheme. The gimbal 560 and the mobile platform 500 can be used to provide a pitch angle and/or a yaw angle to the imaging device 580 for each images according to the imaging scheme.

The plurality of images can be automatically captured according the imaging scheme, at 730. One or more configurable parameters of the imaging device 580 can be configured either automatically and/or manually. The configurable parameters can include, but are not limited to, an output format and/or an exposure setting, such as an aperture, a shutter speed and the like. The configurable based on ambient conditions, including, but not limited to, territorial features, light, direction of the light, time, color and/or an operator's desired effect. When capturing each of the images, the imaging device 580 can be oriented to a desired attitude according to the imaging scheme. When the imaging device 580 is satisfactorily oriented, an image can be captured and corresponding real-time attitude information can be acquired as the image is captured.

Although shown and described as automatically capturing the images for purposes of illustration only, operator intervention can be introduced to the imaging process, such as configuring and/or adjusting certain imaging parameters.

The captured images and real-time attitude information can be stored in a storage media (not shown) for later stitching. Alternatively and/or additionally, each image can be transferred (or sent) to a processing station (not shown) for stitching in either an incremental manner or a global manner.

Figure 34:
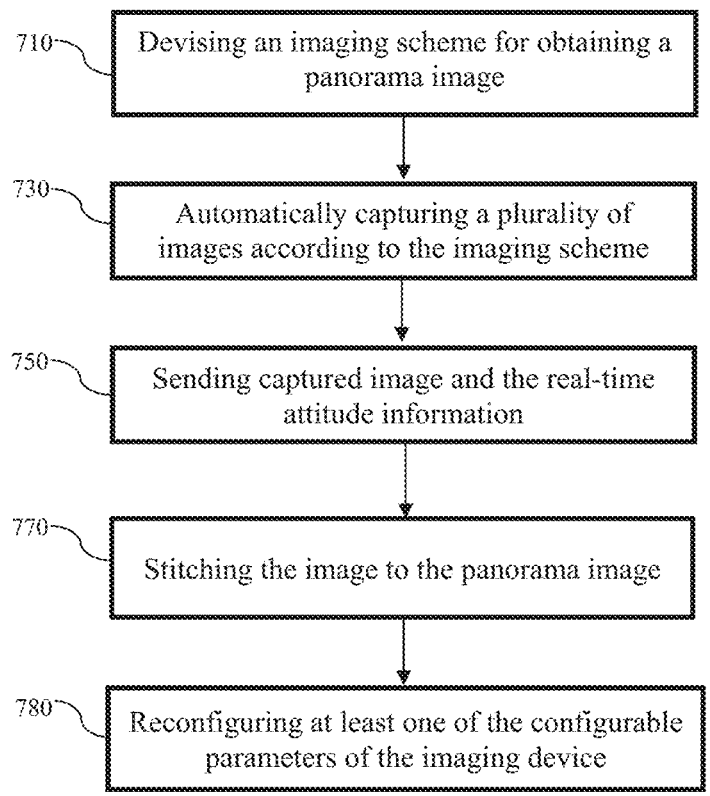
FIG. 34 is a detail exemplary flow-chart diagram illustrating an alternative embodiment of the method of FIG. 33, wherein captured images are sent and stitched for reconfiguring at least one of the configurable parameters.

FIG. 34 illustrates an alternative embodiment of the exemplary method 700. Turning to FIG. 34, captured images are sent and stitched for reconfiguring at least one of the configurable parameters of FIG. 33. In FIG. 34, an imaging scheme for obtaining a panorama image can be devised, at 710. The imaging scheme can be devised based on at least one of an imaging parameter. A plurality of images according to the imaging scheme can be captured automatically, at 730. Meanwhile, real-time attitude information can be acquired when each of the images is captured. The captured image and the acquired real-time attitude information can be stored in a storage media (not shown) for later stitching.

Alternatively and/or additionally, the captured image and the acquired real-time attitude information can be sent, at 750, to a ground station. The captured image can be sent for purposes of previewing a stitching effect of the captured image with at least a portion of the panorama image. The captured image can be sent in a native resolution that can be a high resolution. However, when the captured image is transferred via a wireless communication connection, the wireless communication connection can be a bottleneck for transferring the high resolution image. Alternatively and/or additionally, high resolution images can take more calculation resources than low resolution images. For purposes of facilitating the image transferring and stitching, the resolution of the captured image can be reduced before sending the captured image for stitching.

The captured image can be received by the ground station. The received image can be stitched to the panorama image, at 770. If the received image is a first image, the received image can be used as an anchor image to initialize the panorama image. The effect of the received image alone can be previewed. If the received image is not the first image, the received image can be stitched to the panorama image. The effect of the image merging with the panorama image can be previewed. For preview purposes, in some embodiments, the received image can be stitched in the reduced resolution.

The received image can be stitched by positioning the received image relative to the panorama image and merging the received image to the panorama image. The received image can be positioned by aligning the received image relative to the panorama image based on the attitude information and micro-tuning the received image relative to the panorama image based on a pitch deviation, a yaw deviation and/or a roll deviation. The received image can be merged to the panorama image by any suitable blending algorithm to reduce artifacts of a merging result.

The effect of the received image can be used as a ground for reconfiguring or adjusting at least one of configurable parameters of the imaging device 580, at 780. The configurable parameters can be remotely adjusted. In some embodiments, any captured images can be recaptured with the adjusted configurable parameters. In some embodiments, the preview and reconfiguration process can be controlled until a satisfactory result is achieved. In some alternative embodiments, each of the captured images can be previewed to guaranty a satisfactory result of the panorama image.

When at least a portion of the plurality images are captured with satisfactory configurable parameters, the images can be transferred and stitched for a final result of the panorama image. In some embodiments, the images for the final result can be in native resolution to enhance quality of the panorama. The images for the final result can be transferred via the storage media or via any suitable communication connection, such as a wired or wireless connection. The images can be stitched via any manners shown and described herein.

Although shown and described as reconfiguring the configurable parameters of the imaging device 580 for purposes of illustration only, the preview results can be used as a ground for changing other settings, such as making a change to the imaging scheme and the like. In some embodiments, the preview results can be used for revising the imaging scheme. For example, the number of images can be increased or decreased in a horizontal direction and/or a vertical direction for purposes of increasing or decreasing overlapping areas in the horizontal direction and/or the vertical direction respectively.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. An image processing method comprising:
receiving an image of a scene and attitude information that is used by an imaging device to capture the image of the scene;
converting the received image of the scene to an equirectangular projection; and
stitching the equirectangular projection of the received image, relative to an anchor image, to a panorama image of the scene built on a compositing surface based on the attitude information, the anchor image and the equirectangular projection of the received image including an overlapping area on the panorama image.

2. The method of claim 1, wherein converting the received image comprises:
determining that the received image is captured with a rectilinear lens or captured with a fisheye lens; and
transforming the received image from a rectilinear projection corresponding to the rectilinear lens or a fisheye projection corresponding to the fisheye lens to the equirectangular projection.

3. The method of claim 2, wherein transforming the received image comprises:
transforming the rectilinear projection or the fisheye projection to a spherical projection, the spherical projection being based on a spherical radius equal to a focal length of a lens of the imaging device; and
transforming the spherical projection to the equirectangular projection.

4. The method of claim 1, further comprising:
initiating the panorama image with the anchor image by positioning the anchor image with corresponding attitude information for the anchor image.

5. The method of claim 4, wherein stitching the received image comprises:
aligning the received image relative to the panorama image based on the attitude information for the received image; and
stitching the received image to the panorama image that begins with the anchor image to incrementally construct the panorama image.

6. The method of claim 5, wherein stitching the received image further comprises micro-tuning the overlapping area between the received image and the panorama image, including:
forming the overlapping area between the received image and the panorama image by matching a portion of the received image and a portion of the panorama image; and
determining a searching scope in at least one of a yaw direction, a pitch direction, or a roll direction.

7. The method of claim 6, wherein determining the searching scope comprises:

deciding a searching step length; and deciding numbers of searching steps for each of the yaw direction, the pitch direction, and the roll direction based on at least one of a control error, a delay error, or a vibration amplitude in a pitch deviation, a yaw deviation, and a roll deviation, respectively.

8. The method of claim 7, wherein micro-tuning the overlapping area comprises determining a matching cost for each combination of the searching step and the number of steps in each of the pitch direction, the yaw direction, and the roll direction via a sum of absolute differences ("SAD") measure or a normalized cross-correlation ("NCC") measure.

9. The method of claim 8, wherein micro-tuning the overlapping area comprises ascertaining an optimal combination of yaw-pitch-roll angles.

10. The method of claim 9, wherein stitching the received image comprises fusing the received image to the panorama image based on the optimal combination of yaw-pitch-roll angles via a blending algorithm.

11. The method of claim 10, wherein stitching the received image comprises conducting a global optimization toward at least a portion of the overlapping area.

12. The method of claim 1, wherein the received image is captured according to a spherical panorama imaging scheme.

13. The method of claim 12, wherein at least a portion of the panorama image is constructed via a blending algorithm.

14. The method of claim 13, wherein the blending algorithm includes a Laplacian Pyramid Blending algorithm.

15. The method of claim 1, further comprising:

lowering at least one of a resolution of the received image or a resolution of the panorama image.

16. The method of claim 15, wherein lowering the resolution of the received image comprises reducing a resolution in at least one of a horizontal direction or a vertical direction of the received image.

17. The method of claim 15, wherein lowering the resolution of the panorama image comprises reducing a resolution in at least one of a horizontal direction or a vertical direction of the panorama image.

18. A non-transitory computer readable storage medium storing instructions that, when executed by one or more processors, cause the one or more processors to, individually or collectively:

receive an image of a scene and attitude information that is used by an imaging device to capture the image of the scene;

convert the received image of the scene to an equirectangular projection; and stitch the equirectangular projection of the received image, relative to an anchor image, to a panorama image of the scene built on a compositing surface based on the attitude information, the anchor image and the equirectangular projection of the received image including an overlapping area on the panorama image.

19. A system comprising:

one or more processors; and a memory coupled to the one or more processors and storing instructions that, when executed by the one or more processors, cause the one or more processors to, individually or collectively:

receive an image of a scene and attitude information that is used by an imaging device to capture the image of the scene;

convert the received image of the scene to an equirectangular projection; and stitch the equirectangular projection of the received image, relative to an anchor image, to a panorama image of the scene built on a compositing surface based on the attitude information, the anchor image and the equirectangular projection of the received image including an overlapping area on the panorama image.

* * * * *